US011446593B2

(12) United States Patent
Joscher et al.

(10) Patent No.: US 11,446,593 B2
(45) Date of Patent: Sep. 20, 2022

(54) FILTER ARRANGEMENTS FOR LIQUIDS AND METHODS OF USE

(71) Applicant: Donaldson Company, Inc., Minneapolis, MN (US)

(72) Inventors: Kurt B. Joscher, Burnsville, MN (US); Mark C. Shepherd, Apple Valley, MN (US); Patricia L. Palmby, Wayzata, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 8 days.

(21) Appl. No.: 17/084,035

(22) Filed: Oct. 29, 2020

(65) Prior Publication Data
US 2021/0129050 A1  May 6, 2021

Related U.S. Application Data

(60) Provisional application No. 62/927,971, filed on Oct. 30, 2019.

(51) Int. Cl.
*B01D 29/33* (2006.01)
*B01D 35/30* (2006.01)

(52) U.S. Cl.
CPC ......... *B01D 29/333* (2013.01); *B01D 35/306* (2013.01); *B01D 2201/12* (2013.01); *B01D 2201/295* (2013.01); *B01D 2201/301* (2013.01); *B01D 2201/4092* (2013.01)

(58) Field of Classification Search
CPC .............. B01D 35/30; B01D 2201/295; B01D 2201/347; B01D 29/21; B01D 27/08
See application file for complete search history.

(56) References Cited

U.S. PATENT DOCUMENTS

| 5,114,572 A | 5/1992 | Hunter et al. |
| 5,766,463 A | 6/1998 | Janik et al. |
| 5,770,065 A | 6/1998 | Popoff et al. |
| 6,454,506 B1 | 9/2002 | Keller et al. |
| 6,458,269 B1 | 10/2002 | Bassett et al. |
| 6,615,632 B1 | 9/2003 | Stephan et al. |
| 6,695,891 B2 | 2/2004 | Reid |

(Continued)

FOREIGN PATENT DOCUMENTS

| WO | 9745362 A1 | 12/1997 |
| WO | 2017198408 A1 | 11/2017 |

(Continued)

OTHER PUBLICATIONS

International Search Report and Written Opinion for PCT/US2020/057981 dated Mar. 22, 2021, 20pgs.

(Continued)

*Primary Examiner* — Waqaas Ali
(74) *Attorney, Agent, or Firm* — Merchant & Gould P.C.

(57) ABSTRACT

A filter cartridge has media construction, a housing, and a first end construction. The first end constructions includes an outer radial wall with circumferentially spaced connecting sections; each connecting section having a plurality of helical profiles extending at a helix angle. The filter cartridge is removably attached to a filter head, which has mating connecting segments. A bowl cartridge assembly is also provided including connecting sections with a plurality of helical profiles.

29 Claims, 14 Drawing Sheets

(56) References Cited

U.S. PATENT DOCUMENTS

| | | |
|---|---|---|
| 6,740,234 B1 | 5/2004 | Williams et al. |
| 6,918,727 B2 | 7/2005 | Huang |
| 6,926,826 B2 | 8/2005 | Reid |
| 6,949,189 B2 | 9/2005 | Bassett et al. |
| 7,017,950 B2 | 3/2006 | Macaulay |
| 7,237,682 B2 | 7/2007 | Reynolds et al. |
| 7,387,726 B2 | 6/2008 | Wolf et al. |
| 8,267,436 B2 | 9/2012 | Church |
| 8,268,170 B2 | 9/2012 | Core et al. |
| 8,286,804 B2 | 10/2012 | Weindorf |
| 8,757,393 B2 | 6/2014 | Thienel |
| 9,446,333 B2 | 9/2016 | Vercammen |
| 9,533,244 B2 | 1/2017 | Kreibig |
| 10,052,575 B2 | 8/2018 | Downs et al. |
| 10,071,326 B2 | 9/2018 | Schmoll |
| 2016/0317955 A1 | 11/2016 | Jokschas et al. |

FOREIGN PATENT DOCUMENTS

| | | | | |
|---|---|---|---|---|
| WO | WO-2018075063 A1 | * | 4/2018 | ........... B01D 36/005 |
| WO | 2018175438 A1 | | 9/2018 | |
| WO | 201912425 A1 | | 1/2019 | |

OTHER PUBLICATIONS

Invitation to Pay Additional Fees for PCT/US2020/057981 dated Feb. 1, 2021, 16pgs.

* cited by examiner

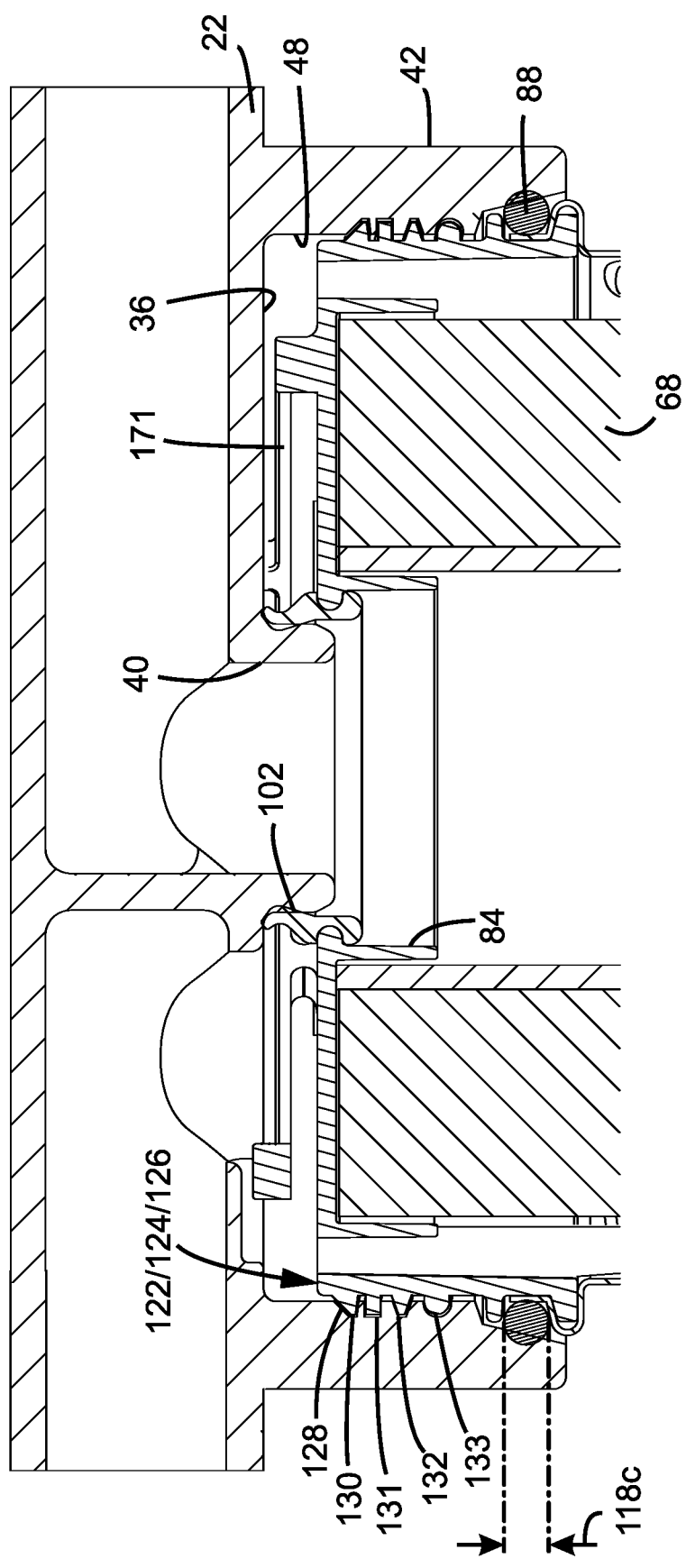

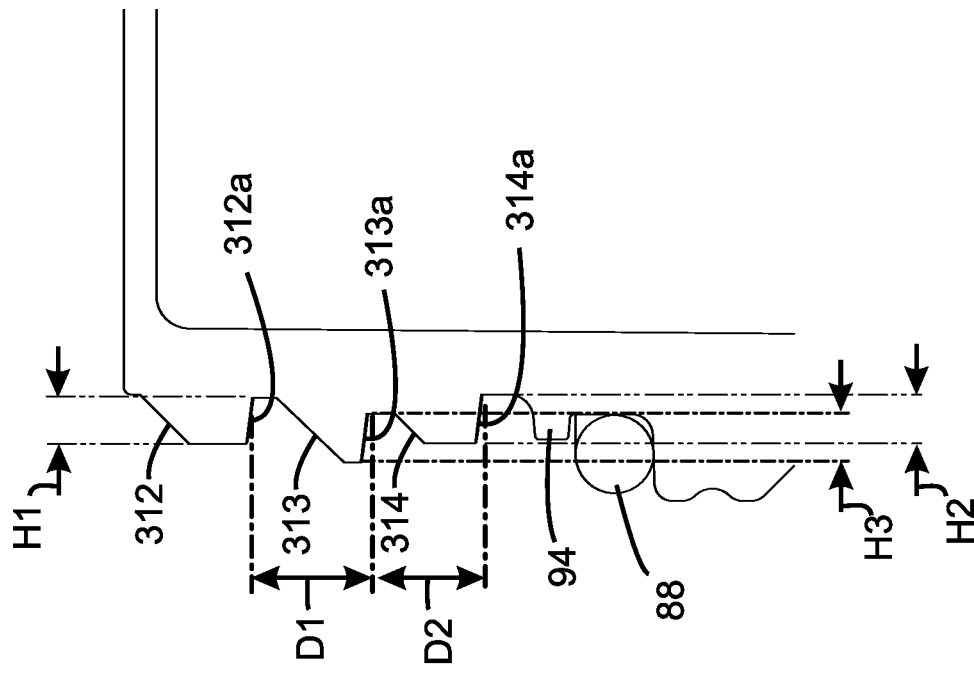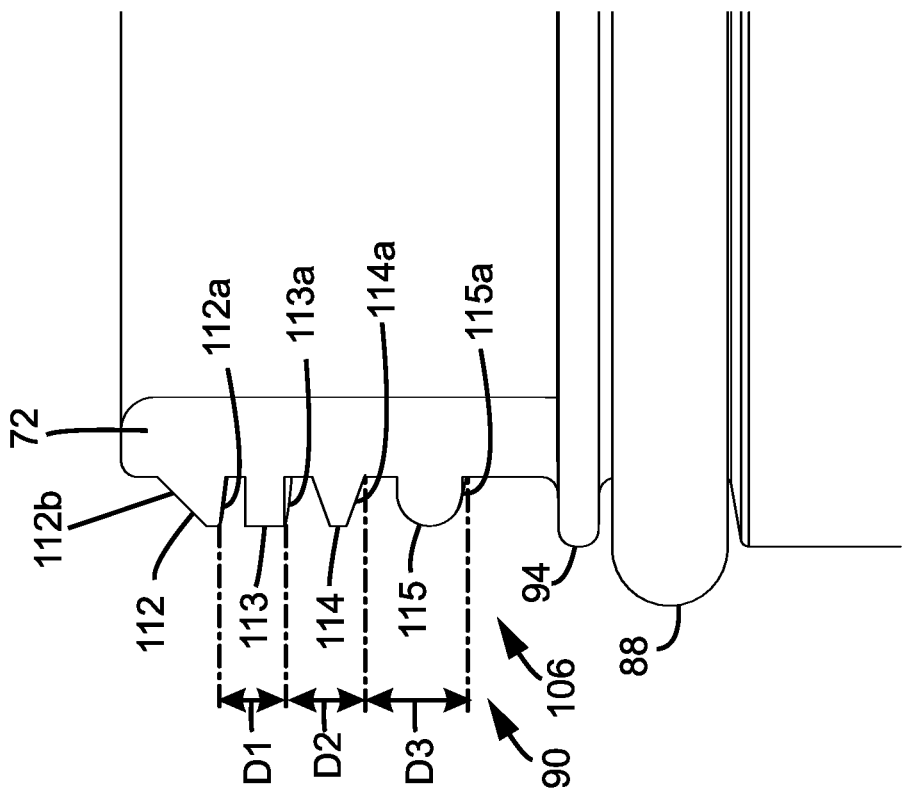

FILTER ARRANGEMENTS FOR LIQUIDS AND METHODS OF USE

This application claims priority to U.S. Ser. No. 62/927,971 filed Oct. 30, 2019, incorporated by reference herein.

TECHNICAL FIELD

This disclosure relates to liquid filter arrangements useable, for example, to filter hydraulic fluids and lubricating fluids. A filter head is described on which a serviceable filter cartridge arrangement is positioned in use. Methods of assembly and use are also provided.

BACKGROUND

Circulating liquid systems such as hydraulic fluids and lubricating fluids, typically require a filter arrangement. The filter arrangement is typically positioned so that the fluids are filtered by passage through filter media positioned within the filter arrangement. Typically the filter arrangement is configured so that the componentry containing the media is a service part, i.e., the media can, periodically, be removed and be replaced.

There are two common types of liquid filter arrangements. The first, typically referred to herein as a "spin-on" type, involves a filter head installed on equipment, and a spin-on filter member or cartridge. The filter member or cartridge is often referred to as "spin-on" because the assembly including the filter media is typically secured to the filter head by threading. In spin-on arrangements, the filter media is typically non-removably secured within a shell or housing as a housing/media combination, and the entire housing/media combination, as a filter member or cartridge, is removed and replaced during servicing.

The second common type of liquid filter arrangement is referred to herein as a bowl/cartridge arrangement. With a bowl/cartridge arrangement, the filter head is again installed on the equipment. The filter media, however, is contained within a filter cartridge in a form removably positioned within a housing or shell. A housing/cartridge combination is again mounted on the filter head for use. However, during servicing, the housing is disconnected from the filter head, the media contained within the housing or shell is replaced, and the same shell or housing, with the replacement media inside, is then remounted on the filter head.

A well-functioning filter arrangement is important in protecting downstream equipment, such as an engine or hydraulic machinery. Improvements in filter arrangements are always desirable.

SUMMARY

In one aspect, a filter cartridge comprises: (a) a treatment media construction having a first end and an opposite second end; (b) a first end construction adjacent to the first end of the media construction; wherein the first end construction includes an outer radial wall and an axial wall;
(i) the axial wall covering the first end of the media construction; (ii) the outer radial wall having a plurality of connecting sections alternating with non-connecting sections; (c) a filter housing having a surrounding wall defining an exterior, an interior, a bottom, and an opposite mouth;
(i) the filter housing being secured to the outer radial wall at the mouth; and (ii) the media construction being positioned within the interior and spaced from the surrounding wall.

In various examples: the outer radial wall can overlaps a portion of the media construction; or the non-connecting sections are smooth; or the treatment media construction includes pleated media arranged in a tube-shape having an open interior volume; or the bottom of the filter housing is closed; or each of the non-connecting sections is equally spaced from each other; or further comprising a seal member secured to the exterior of the filter housing; or the connecting sections of the outer radial wall are outside of the filter housing; or the connecting sections of the outer radial wall are along an outer external portion of the outer radial wall; or the connecting sections of the outer radial wall are along an internal portion of the outer radial wall; or each connecting section has a plurality of helical profiles extending at a helix angle; or each of the helical profiles within each connecting section has a different cross-sectional shape from at least one other helical profile within a respective connecting section.

In various examples: within each connecting section, each of the helical profiles is axially spaced from an adjacent helical profile, and the axially spacing between at least one helical profiles and a second helical profile is different from remaining axially spacing; or each connecting section is identical to the other connecting sections; or each connecting section has at least 4 helical profiles; or there are at least 3 connecting sections; or further including a radially protruding stop member extending from the outer radial wall at terminal ends of the helical profiles of at least one of the connecting sections; or further including at least one spring-loaded detent extending axially outwardly from the axial wall of the first end construction; or there are a plurality of spring-loaded detents extending axially outwardly from the axial wall of the first end construction; or each spring-loaded detent includes a leaf spring attached to the axial wall of the first end construction.

In various examples: the first end construction is part of a first end cap, and the first end cap is secured to the first end of the media construction; or further including a second end cap secured to the second end of the media construction.

In example embodiments, (a) the outer radial wall of the first end construction includes a seal member seat having a pair of outward radially extending flanges with a wall section therebetween; (b) the housing is attached to the outer radial wall by being folded over at least a first of the flanges and covering the wall section; and (c) the seal member is oriented radially outwardly in the seal member seat and against the housing.

In various examples, the first end construction includes an aperture in communication with the open interior volume; or further comprising a seal member oriented in the aperture of the first end construction; or the seal member is a grommet; or portions of the outer radial wall are axially spaced from the axial wall to define a plurality of circumferentially spaced gaps defining fluid flowpaths; or the outer radial wall includes the plurality of circumferentially spaced connecting sections alternating with the gaps; or the outer radial wall has a continuous ring at a distal end from the axial wall; the continuous ring holding the seal member thereon; or each of the non-connecting sections are spaced from each other; or the filter housing is non-removably secured to the outer radial wall at the mouth.

In another aspect, a filter cartridge comprises: (a) a treatment media construction having a first end and an opposite second end; (b) a first end construction adjacent to the first end of the media construction; (c) wherein the first end construction includes an outer radial wall and an axial wall; (i) the axial wall covering the first end of the media construction; (ii) the outer radial wall having a plurality of circumferentially spaced connecting sections; each connecting section having a plurality of helical profiles extending at a helix angle; (iii) each of the helical profiles within each connecting section has a different cross-sectional shape from at least one other helical profile within a respective connecting section; (d) a filter housing having a surrounding wall defining an exterior, an interior, a bottom, and an opposite mouth; (i) the filter housing being secured to the outer radial wall at the mouth; and (ii) the media construction being positioned within the interior and spaced from the surrounding wall.

In example embodiments, within each connecting section, each of the helical profiles is axially spaced from an adjacent helical profile, and the axially spacing between at least one helical profiles and a second helical profile is different from remaining axially spacing.

In another aspect, a filter cartridge comprises: (a) a treatment media construction having a first end and an opposite second end; (b) a first end construction adjacent to the first end of the media construction; (c) wherein the first end construction includes an outer radial wall and an axial wall; (i) the axial wall covering the first end of the media construction; (ii) the outer radial wall having a plurality of circumferentially spaced connecting sections; each connecting section having a plurality of helical profiles extending at a helix angle; (iii) within each connecting section, each of the helical profiles being axially spaced from an adjacent helical profile, and the axially spacing between at least one helical profiles and a second helical profile is different from remaining axially spacing; and (d) a filter housing having a surrounding wall defining an exterior, an interior, a bottom, and an opposite mouth; (i) the filter housing being secured to the outer radial wall at the mouth; and (ii) the media construction being positioned within the interior and spaced from the surrounding wall.

In various examples: the connecting sections are separated by a plurality of non-connecting sections on the outer radial wall, the non-connecting sections being spaced from each other; or the outer radial wall overlaps a portion of the media construction; or the treatment media construction includes pleated media arranged in a tube-shape having an open interior volume; or the bottom of the filter housing is closed; or each of the non-connecting sections is equally spaced from each other; or further comprising a seal member secured to the exterior of the filter housing; or the connecting sections of the outer radial wall are outside of the filter housing; or the connecting sections of the outer radial wall are along an outer external portion of the outer radial wall; or the connecting sections of the outer radial wall are along an internal portion of the outer radial wall; or each connecting section is identical to the other connecting sections; or each connecting section has at least 4 helical profiles; or there are at least 3 connecting sections; or further including a radially protruding stop member extending from the outer radial wall at terminal ends of the helical profiles of at least one of the connecting sections.

In various examples: further including at least one spring-loaded detent extending axially outwardly from the axial wall of the first end construction; or there are a plurality of spring-loaded detents extending axially outwardly from the axial wall of the first end construction; or each spring-loaded detent includes a leaf spring attached to the axial wall of the first end construction; or the first end construction is part of a first end cap and is secured to the first end of the media construction; or further including a second end cap secured to the second end of the media construction.

In some examples, (a) the outer radial wall of the first end construction includes a seal member seat having a pair of outward radially extending flanges with a wall section therebetween; (b) the housing is attached to the outer radial wall by being folded over at least a first of the flanges and covering the wall section; and (c) the seal member is oriented radially outwardly in the seal member seat and against the housing.

In various examples: the first end construction includes an aperture in communication with the open interior volume; or further comprising a seal member oriented in the aperture of the first end construction; or the seal member is a grommet; or portions of the outer radial wall are axially spaced from the axial wall to define a plurality of circumferentially spaced gaps defining fluid flowpaths; or the outer radial wall includes the plurality of circumferentially spaced connecting sections alternating with the gaps; or the outer radial wall has a continuous ring at a distal end from the axial wall; the continuous ring holding the seal member thereon; or the filter housing is non-removably secured to the outer radial wall at the mouth; or each of the helical profiles within each connecting section has a different cross-sectional shape from at least one other helical profile within a respective connecting section.

In another aspect, a filtration assembly comprises: (a) a filter cartridge as variously characterized above; and (b) a filter head removably attached to the filter cartridge and forming a seal with the seal member of the filter cartridge.

In examples, the filter head includes: (a) an end wall (36); and (b) a circumferential band extending axially from the end wall; the band including a plurality of circumferentially spaced connecting segments constructed and arranged to mate with the connecting sections of the filter cartridge.

In various examples: the plurality of circumferentially spaced connecting segments is on an inner radial surface of the band; or the plurality of circumferentially spaced connecting segments is on an outer radial surface of the band; or the end wall includes an interior surface surrounded by the band; the interior surface of the end wall including one or more recesses positioned to receive the spring-loaded detent.

In another aspect, a method of servicing a filtration assembly including a filter cartridge mounted on a filter head comprises: (a) removing the filter cartridge from the filter head by rotating the cartridge relative to the head to unmate connecting sections on the cartridge from connecting segments on the head; (b) providing a new filter cartridge having alternately circumferentially spaced connecting sections and non-connecting sections; (c) mounting the new filter cartridge on the head by pushing the new filter cartridge axially and rotating the new filter cartridge less than 90° to engage the connecting sections of the new filter cartridge with connecting segments on the filter head; and (d) while rotating, compressing a seal member on the new filter cartridge to form a seal between and against the head and the new filter cartridge.

In examples: the step of providing a new filter cartridge includes providing a filter cartridge having smooth non-connecting sections, each of the non-connecting sections being equally spaced from each other; or the step of mounting the new filter cartridge on the head includes rotating the new filter cartridge until a stop member is engaged to prevent further rotation.

In another aspect, a method of servicing a filtration assembly including a filter cartridge mounted on a filter head comprises: (a) removing the filter cartridge from the filter head by rotating the cartridge relative to the head to unmate connecting sections on the cartridge from connecting segments on the head; (b) providing a new filter cartridge having connecting sections; each connecting section having a plurality of helical profiles extending at a helix angle; and each of the helical profiles within each connecting section has a different cross-sectional shape from at least one other helical profile within a respective connecting section; (c) mounting the new filter cartridge on the head by pushing the new filter cartridge axially and rotating the new filter cartridge less than 90° to engage the connecting sections of the new filter cartridge with connecting segments on the filter head; and (d) while rotating, compressing a seal member on the new filter cartridge to form a seal between and against the head and the new filter cartridge.

In another aspect, a method of servicing a filtration assembly including a filter cartridge mounted on a filter head comprises: (a) removing the filter cartridge from the filter head by rotating the cartridge relative to the head to unmate connecting sections on the cartridge from connecting segments on the head; (b) providing a new filter cartridge having connecting sections; each connecting section having a plurality of helical profiles extending at a helix angle; and within each connecting section, each of the helical profiles being axially spaced from an adjacent helical profile, and the axially spacing between at least one helical profiles and a second helical profile is different from remaining axially spacing; (c) mounting the new filter cartridge on the head by pushing the new filter cartridge axially and rotating the new filter cartridge less than 90° to engage the connecting sections of the new filter cartridge with connecting segments on the filter head; and (d) while rotating, compressing a seal member on the new filter cartridge to form a seal between and against the head and the new filter cartridge.

In another aspect, a method of servicing a filtration assembly including a filter cartridge mounted on a filter head comprises: (a) removing the filter cartridge from the filter head by rotating the cartridge relative to the head to unmate connecting sections on the cartridge from connecting segments on the head; (b) providing a new filter cartridge having connecting sections; each connecting section having a plurality of helical profiles extending at a helix angle; and within each connecting section, a first of the helical profiles being different from at least one other helical profile based on one or more of: profile shape, axial spacing, or axial depth; (c) mounting the new filter cartridge on the head by pushing the new filter cartridge axially and rotating the new filter cartridge less than 90° to engage the connecting sections of the new filter cartridge with connecting segments on the filter head; and (d) while rotating, compressing a seal member on the new filter cartridge to form a seal between and against the head and the new filter cartridge.

In various examples: the step of mounting the new filter cartridge on the head includes rotating the new filter cartridge until a stop member is engaged to prevent further rotation; the step of rotating includes rotating the new filter cartridge until a click is detected by a person conducting the method; or the click is one or both of an audible click or tactile click; or the step of rotating until a click is detected includes rotating until detents on the new filter cartridge are received within detent recesses in the head; or the step of mounting includes aligning an outlet opening of the head with a grommet seal member on the new filter cartridge; or the step of rotating includes rotating the new filter cartridge until a stop member is engaged between the new filter cartridge and the head; or the step of providing a new filter cartridge includes providing the filter cartridge as variously characterized above.

In another aspect, a bowl cartridge assembly comprises: (a) a filter cartridge having a media construction; and (b) a bowl having an outer radial wall and an interior volume; the filter cartridge being removably mountable within the interior volume; the outer radial wall having a plurality of connecting sections alternating with non-connecting sections; (i) each connecting section having a plurality of helical profiles extending at a helix angle; and within each connecting section, a first of the helical profiles being different from at least one other helical profile based on one or more of: profile shape, axial spacing, or axial depth.

In various examples: the non-connecting sections are smooth; or the media construction includes pleated media arranged in a tube-shape having an open interior volume; or each of the non-connecting sections is equally spaced from each other; or each connecting section is identical to the other connecting sections; or each connecting section has at least 4 helical profiles.

there are at least 3 connecting sections; or further including a radially protruding stop member extending from the outer radial wall at terminal ends of the helical profiles of at least one of the connecting sections; or the filter cartridge includes a first end construction with an axial wall covering the media construction.

In various examples: further including at least one spring-loaded detent extending axially outwardly from the axial wall of the first end construction; or there are a plurality of spring-loaded detents extending axially outwardly from the axial wall of the first end construction; or each spring-loaded detent includes a leaf spring attached to the axial wall of the first end construction; or the first end construction is part of a first end cap, and the first end cap is secured to a first end of the media construction; or further including a second end cap secured to a second end of the media construction; or portions of the outer radial wall are radially spaced the filter cartridge to define a plurality of circumferentially spaced gaps defining fluid flowpaths.

In another aspect, a filtration assembly comprises: (a) a bowl cartridge assembly as variously characterized above; and (b) a filter head removably attached to the filter cartridge and forming a seal with a seal member between the bowl cartridge assembly and the filter head.

In another aspect, a filter cartridge for use in a bowl cartridge assembly comprises: (a) a treatment media construction having a first end and an opposite second end; (b) a first end construction adjacent to the first end of the media construction; wherein the first end construction includes an outer radial wall and an axial wall; the axial wall covering the first end of the media construction; (c) a first plurality of circumferentially spaced radial projections extending from the outer radial wall; (i) the first plurality of radial projections having a first longitudinal length with a terminal end sized to engage a rim of a filter bowl, when the cartridge is inserted into a filter bowl; (ii) the first plurality of radial projections having a least one lateral portion oriented to circumferentially abut a part of the filter bowl when the cartridge is inserted into a filter bowl;

(d) a second plurality of circumferentially spaced radial projections extending from the outer radial wall; (i) the second plurality of radial projections having a second longitudinal length that is shorter than the first longitudinal length; (ii) the second plurality of radial projections oriented to assist with correct rotational positioning of the cartridge within a filter bowl, when the cartridge is inserted into a filter bowl; and (e) at least one spring-loaded detent extending axially outwardly from the axial wall of the first end construction.

In examples: there are a plurality of spring-loaded detents extending axially outwardly from the axial wall of the first end construction; or each spring-loaded detent includes a leaf spring attached to the axial wall of the first end construction; or the first end construction is part of a first end cap, and the first end cap is secured to the first end of the media construction; or further including a second end cap secured to the second end of the media construction; or the treatment media construction includes pleated media arranged in a tube-shape having an open interior volume.

In another aspect, a bowl cartridge assembly comprises (a) a filter cartridge as variously characterized above; (b) a bowl having an outer radial wall and an interior volume; the filter cartridge being removably mountable within the interior volume; the outer radial wall having a plurality of connecting sections alternating with non-connecting sections; (i) each connecting section having a plurality of helical profiles extending at a helix angle; and within each connecting section, a first of the helical profiles being different from at least one other helical profile based on one or more of: profile shape, axial spacing, or axial depth.

In example embodiments, the outer radial wall and the axial wall are integral.

According to the present disclosure, a variety of features and techniques are provided that can be implemented in liquid filter arrangements, such as hydraulic filter arrangement or lubricant (oil) filter arrangements. Selected ones of the techniques can be applied in, preferably, spin-on filter arrangements.

Techniques described include features incorporated in one or both of the filter head and/or filter member removably mounted on the filter head.

There is no requirement that all of the techniques described herein be incorporated in a given system, for that system to obtain at least some advantage.

BRIEF DESCRIPTION OF THE DRAWINGS

FIG. 12 is a partial cross-sectional view of the filter assembly, depicting the filter cartridge of FIG. 1 removably attached to the filter head of FIGS. 9-11;

FIG. 20 is a view similar to FIG. 8 showing an alternate embodiment of a portion of filter cartridges used herein; and FIG. 21 is another view similar to FIGS. 8 and 20 showing another alternate embodiment of a portion of filter cartridges used herein.

DETAILED DESCRIPTION

Figure 1:
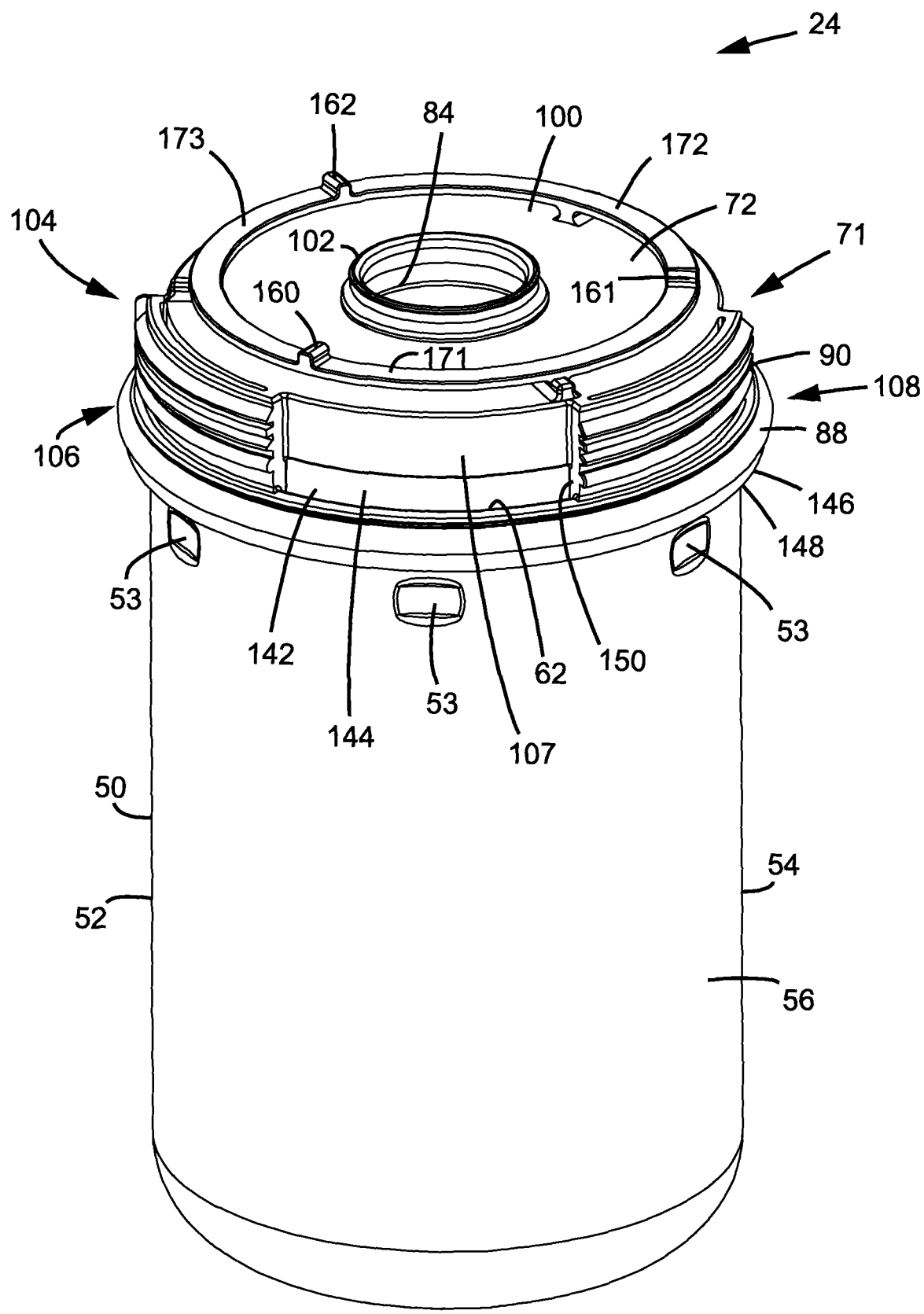
FIG. 1 is a perspective view of a spin-on filter cartridge, constructed in accordance with principles of this disclosure.
Figure 2:
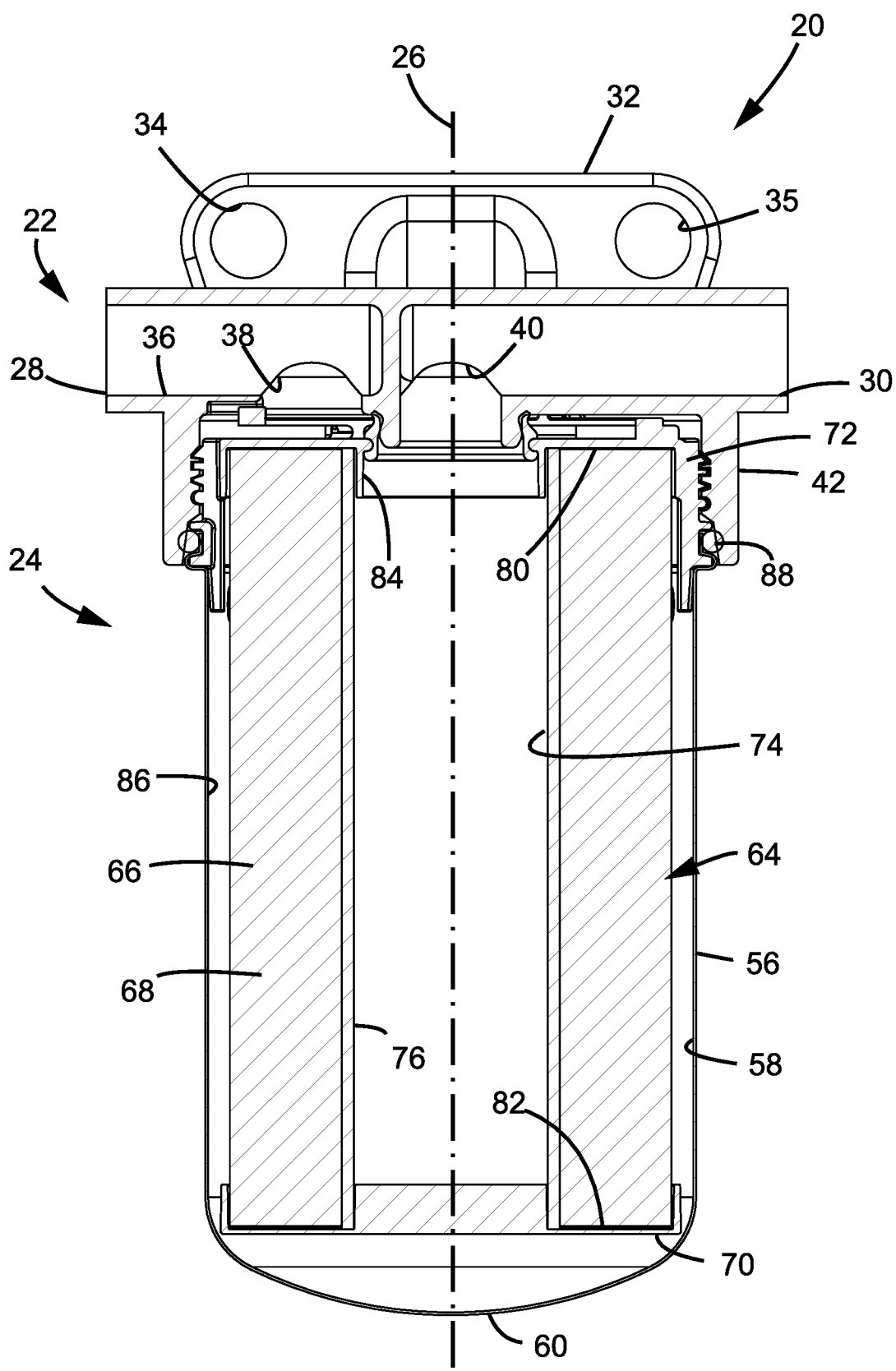
FIG. 2 is a cross-sectional view of a filter assembly including the filter cartridge of FIG. 1 connected to a filter head.
Figure 3:
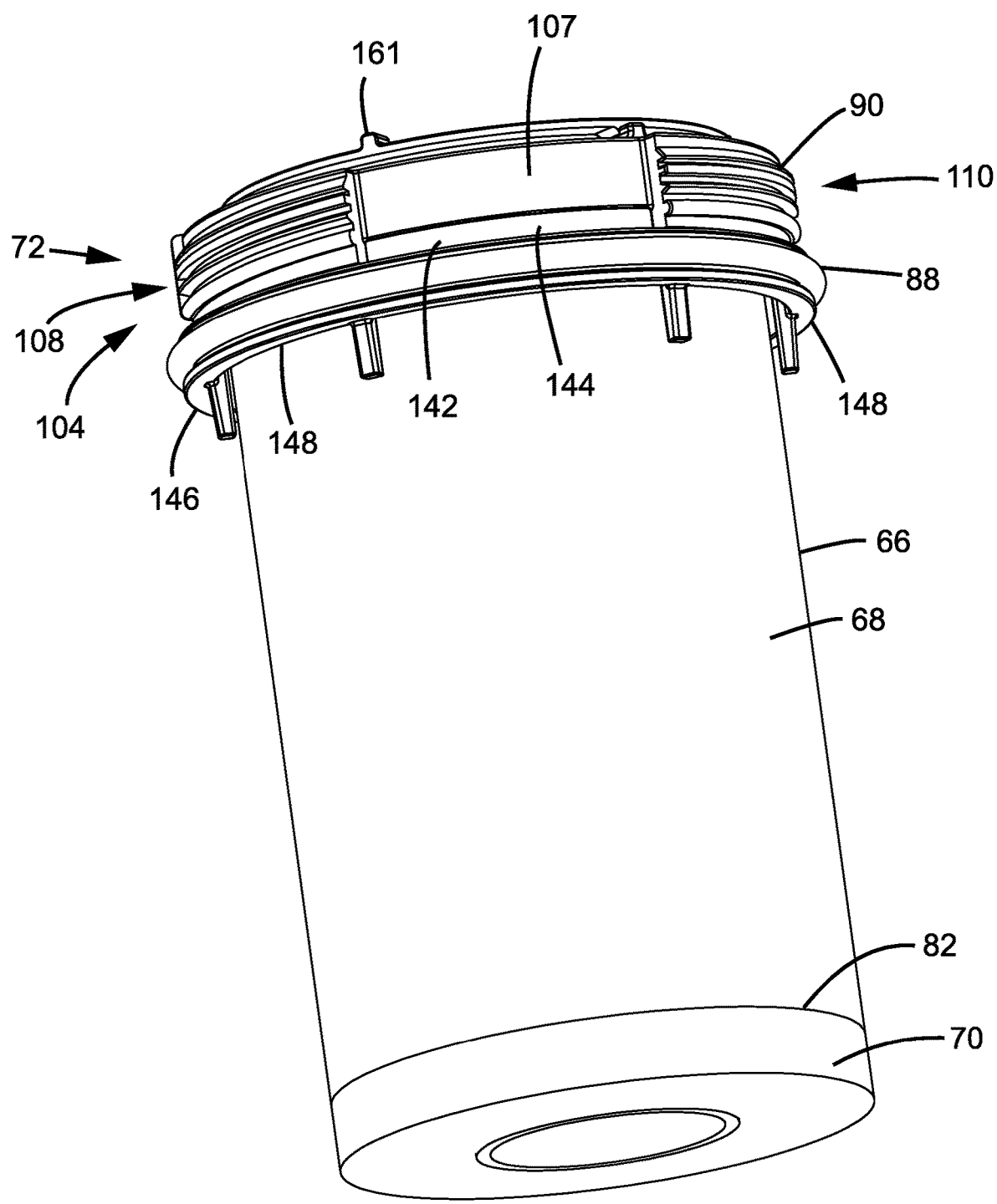
FIG. 3 is a perspective view of a portion of the filter cartridge of FIG. 1, with the outer housing removed.
Figure 4:
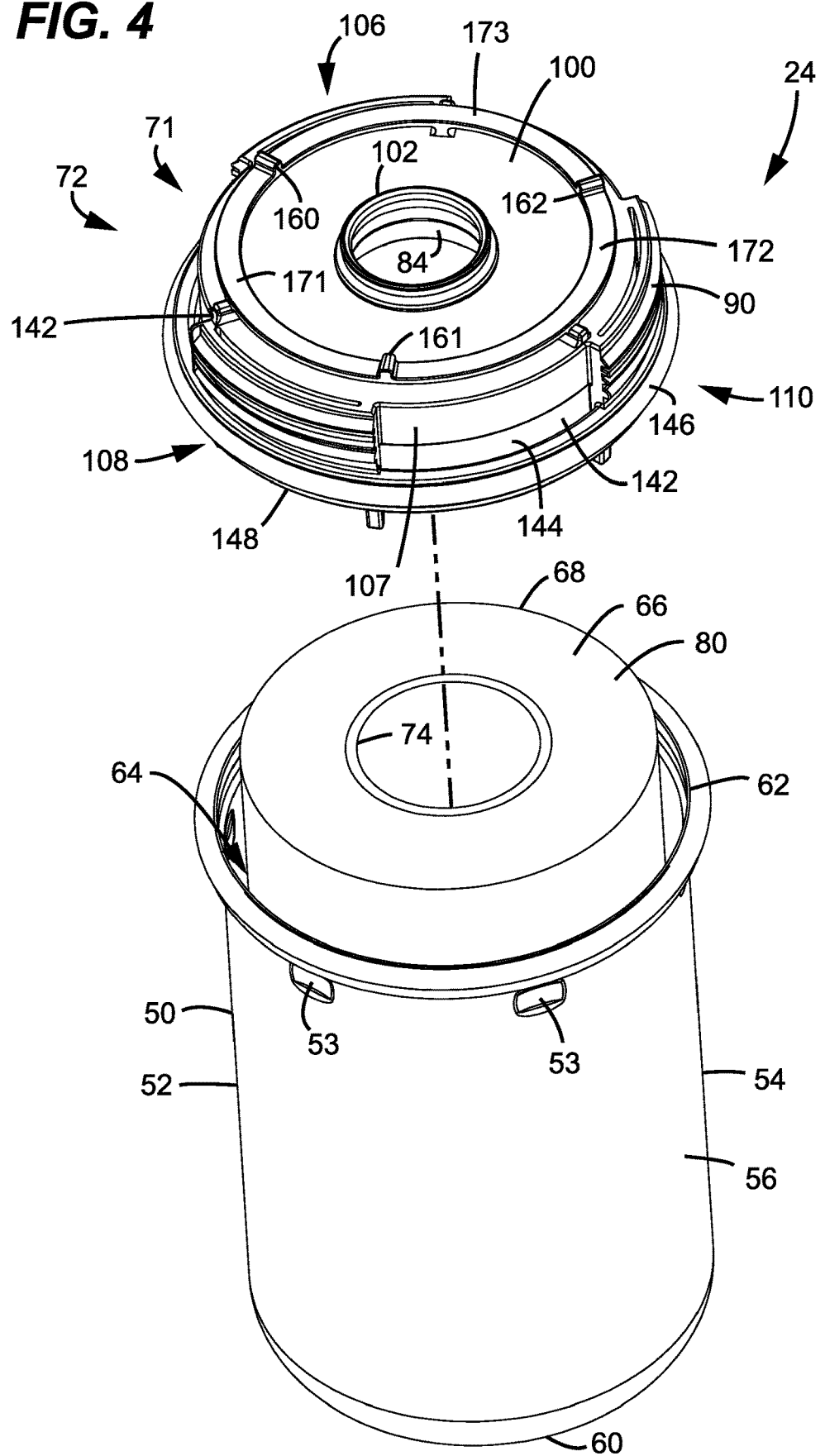
FIG. 4 is an exploded perspective view of the filter cartridge of FIG. 1.

In FIG. 2, reference numeral 20 generally indicates a liquid filter assembly according to the present disclosure. The liquid filter assembly 20 includes a filter head 22 and a filter cartridge 24. The filter head 22 is typically installed on equipment, in a liquid line, for example a hydraulic line or lubricating fluid (oil) line. During servicing the filter head 22 would typically remain in place in the equipment.

The filter cartridge 24, on the other hand, is removably mounted on the filter head 22. Servicing is provided by replacement of the media contained within the filter cartridge 24. The filter cartridge 24 depicted herein is a spin-on type of filter cartridge. Thus, during servicing, the entire filter cartridge 24, including both the media and outer housing, is removed and discarded and replaced with an entirely new filter cartridge 24.

In the cross section of FIG. 2, a central longitudinal axis 26 is depicted, around which the filter assembly 20 is positioned. The terms "axial", "axially" and variants thereof, as used herein, is generally meant to refer to a feature extending in the general direction of the axis 26. The terms "radial", "radially", and variants thereof, are meant to refer to a direction toward or away from the axis 26.

Still in reference to FIG. 2, the filter head 22 includes a liquid flow inlet 28 and a liquid flow outlet 30. During operation, liquid to be filtered is directed into the filter head 22 through the inlet 28. Liquid is then directed through the filter cartridge 24 for filtration. The filtered liquid is then returned to the filter head 22 to exit through the outlet 30.

In a typical system, the filter head 22 comprises a cast metal part, for example, cast aluminum, with various features added thereto.

While many embodiments are possible, in the one shown, the filter head 22 includes a flange 32, which can have bolt holes 34, 35 for securing the filter at 22 to the equipment.

Secured to the flange 32 is an end wall 36. The end wall 36 will typically include an inlet opening 38 in communication with the inlet 28, to allow for the flow of liquid from the filter head 22 into the cartridge 24. End wall 36 will also have an outlet opening 40 to allow for the flow of filtered liquid from the cartridge 24 into the filter head 22 to allow it to exit through the main outlet 30.

Extending axially from the end wall 36 is a circumferential band 42. The band 42 has a surrounding wall 44 with an exterior surface 46 and an opposite interior or inner radial surface 48. The inner radial surface 48 include a system to allow for selective attachment and detachment between the filter head 22 and the filter cartridge 24, which is discussed further below.

The filter cartridge 24 is shown in perspective view in FIG. 2 and cross section in FIG. 2 connected to the filter head 22. The filter cartridge 24 includes a filter housing 50. The filter housing 50 includes an external can or shell 52 that has a surrounding wall 54. The surrounding wall 54 has an exterior surface 56 and an opposite interior surface 58. There is a closed bottom 60 and an opposite mouth 62 that interfaces with the filter head 22.

The shell 52 can include a plurality of anti-slip dimples 53 circumferentially spaced about the shell 52 adjacent to the mouth 62. The dimples 53 can be helpful for the user to be able to apply a grip on the cartridge 24, when attaching or removing the cartridge 24 and the filter head 22.

Typically, the outer shell 52 comprises a metal component. The housing 50 defines an interior volume 64. Within the interior volume 64 is positioned a filter media construction 66. The filter media construction 66 comprises a filter media 68 positioned in extension between a second (lower) end cap 70 and a first (upper) end construction 71. The end construction 71 is adjacent to a first end of the media construction 66 and can be part of a first end cap 72 secured to the media construction 66. The media 68 can comprise a variety of materials as selected for the particular operation and conditions to be encountered. Typically, the filter media 68 would be provided in a pleated form, although alternatives are possible. A variety of types or shapes of media or media pleats can be used. Adhesive beads, for example, can help maintain media integrity and pleat spacing. In some alternative arrangements, the media 68 can be lined with a plastic or wire mesh screen, if desired.

Filter media construction 66 can be tubular in shape and configured around, and defines, an open filter interior volume 74. Positioned within the opened filter interior volume 74 is an internal media support 76, in this example, comprising a porous liner extending along the media 68 between the end caps 70, 72 and secured to the end caps 70, 72.

Although alternatives are possible, in the example shown, the second end cap 70 is a closed end cap, meaning it has a closed center prohibiting passage therethrough of unfiltered liquid. The tubular filter media construction 66 has a first end 80, which is secured to the first end cap 72, and an opposite second end 82, which is secured to the second end cap 70. The media 68 is secured to the second end cap 70 by various methods, including adhering or potting, or by molding in place on the media 68. A variety of materials can be used for the end cap 70, which can include metal or plastic.

The first end cap 72, on the other hand, is typically an open end cap defining a central flow aperture 84 therethrough. The aperture 84 is positioned in direct flow communication with the interior 74 of the media 68. Herein, the term "direct flow communication" is meant to refer to a passageway that allows a flow communication with the interior 74 in a manner that does not require passage through the media 68. That is, liquid within the interior 74 can flow through the aperture 84 directly, without passing through the media 68 at the same time. Of course, the liquid does not reach the interior 74 unless it has first passed through the media 68 in the first instance, for an "out-to-in" flow arrangement as described.

As indicated, the filter cartridge 24 depicted is configured for out-to-in flow, during filtering. By this, it is meant that unfiltered liquid is directed from the filter head 22 into an annulus 86 around the media 68 and between the interior surface 58 of the wall 54; and then through the media 68, through the support 76 and into the interior 74. The filtered liquid is then directed upwardly through central flow aperture 84 in the first end cap 72, back into the filter head 22 through the outlet opening 40 and then out through the outlet exit 30.

It is noted that many of the principles described herein can be utilized in association with a "in-to-out" flow arrangement, in which the flow direction for liquid being filtered is in the reverse direction, i.e., through the aperture 84, into the interior 76, through the media 68, into the annulus 86, and then back into the filter head 22.

In general, a seal arrangement is needed between the filter cartridge 24 and the filter head 22 in order to prevent liquid flow from bypassing the media 68 as it is directed through the filter cartridge 24. Such a seal arrangement is provided by a seal member 88 on the cartridge 24 to form a seal between and against the cartridge 24 and the filter head 22.

Attention is directed to FIGS. 3-7, in which the first end construction 71 is illustrated, either by itself or in combination with other features. The first end construction 71 includes an outer radial wall 90. The outer radial wall 90 extends at least a portion of the length of the filter media construction 66 from the first end 80 in a direction toward the second end 82. The outer radial wall 90 covers or overlaps a portion of the media construction 66. While many examples are possible, in the one shown, the outer radial wall 90 overlaps less than 25% and greater than 5% of an overall length of the filter media construction between the first end 80 and second end 82.

Figure 8:
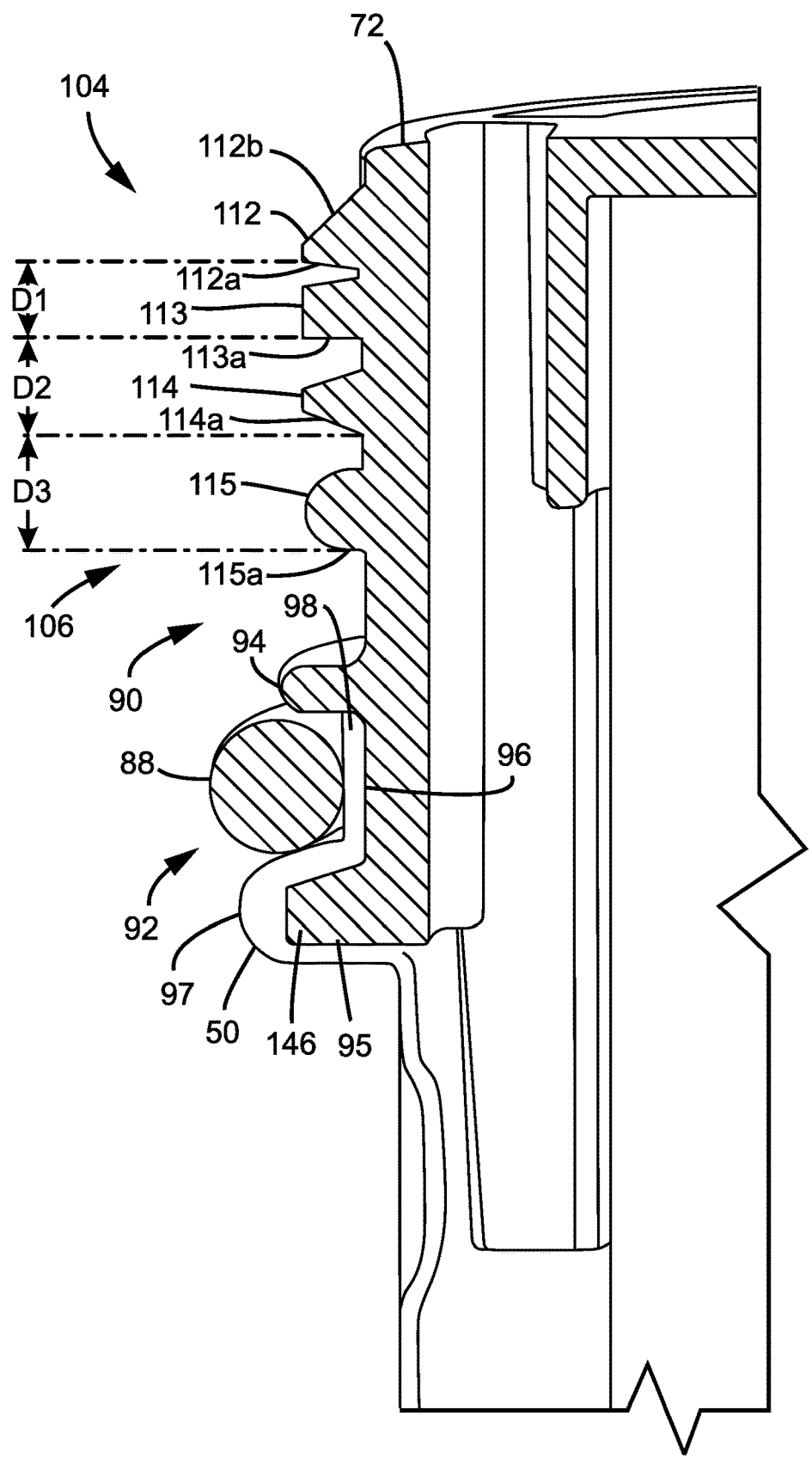
FIG. 8 is an enlarged cross-sectional view of a portion of the filter cartridge of FIG. 1.

In FIG. 8, the outer radial wall 90 of the first end construction 71 is shown enlarged. The outer radial wall 90 defines a seal member seat 92, which holds the seal member 88. In the example shown, the seal member seat 92 has a pair of outward radially extending flanges 94, 95 with a wall section 96 therebetween. The seal member 88 is positioned between the flanges 94, 95.

Still in reference to FIG. 8, it can be seen how the housing 50 is attached to the first end construction 71. While many different techniques are available, in the example shown, the housing 50 is attached to the outer radial wall 90. In particular, the housing 50 is non removably fixed or secured to the outer radial wall 90 by being folded over at least a first of the flanges 95. The housing 50 can cover at least a portion of the wall section 96 in between the flanges 94, 95. In some embodiments, the housing 50 can also be folded over at least a portion of the second of the flanges 94 and completely cover the wall section 96 at fold 97. In FIG. 8, the seal member 88 is oriented radially outwardly in the seal member seat 92 and against the housing 50. In the example shown, the housing 50 is sandwiched between and against the seal member 88 and the wall section 96 of the outer radial wall 90 of the first end construction 71.

The first end construction 71 further includes an axial wall 100. The axial wall 100 covers the first end 80 of the media construction 66. In general, the outer radial wall 90 extends at about a 90° angle relative to the axial wall 100. The axial wall 100 defines the central flow aperture 84. The central flow aperture 84 can further accommodate a seal member, such as a grommet seal member 102 therein for connection with the filter head 22, e.g., the portion of the filter head 22 defining the outlet opening 40.

The first end construction 71 includes, in the example embodiment shown, a plurality of circumferentially spaced non-connecting sections 107, shown in the example figures at 107*a*, 107*b*, and 107*c*. The non-connecting sections 107 are, in general, along the outer radial wall 90 as either complete gaps (no wall structure at all); or smooth sections of the wall 90; or sections of the wall 90 that are non-interfering with the filter head 22, when the filter head 22 is attached to the cartridge 24. In preferred implementations, the non-connecting sections 107 are both equal in circumferential length and equally spaced from each other. In this case, when there are the three non-connecting sections 107*a*, 107*b*, and 107*c*, they are separated from each other by 60°.

In accordance with principles of this disclosure, the filter cartridge 24 includes a system to allow for a low friction installation of the cartridge 24 to the filter head 22, including simply inserting and rotating the cartridge less than a full turn. In this embodiment, the system includes a connection system 104. The connection system 104 will allow for low friction insertion and turning of the cartridge 24 less than 180° for example, about 60°. The connection system 104 eliminates cross-threading, and lends itself to having the connectors be specific to specific customers.

In the example embodiment illustrated, the connection system 104 includes a plurality of circumferentially spaced connecting sections, illustrated herein as 106, 108, and 110. Each connecting section 106, 108, 110 includes a plurality of helical profiles 112, 113. There can be at least two helical profiles 112, 113 and more than two helical profiles, for example, three helical profiles 112, 113, 114. In the example shown, there are four helical profiles 112, 113, 114, 115 (FIG. 8).

Each of the helical profiles 112, 113, 114, 115 extends circumferentially along and projecting from the outer radial wall 90. By "helical profile", it is meant a the geometrical outline along an outermost border which, if continued, would have a general spiral shape. A helical profile is not a screw thread. In a helical profile, a plane perpendicular to the central longitudinal axis will pass through more than one profile, whereas in a screw thread, a plane perpendicular to the central longitudinal axis will pass through only one thread profile.

Figure 7:
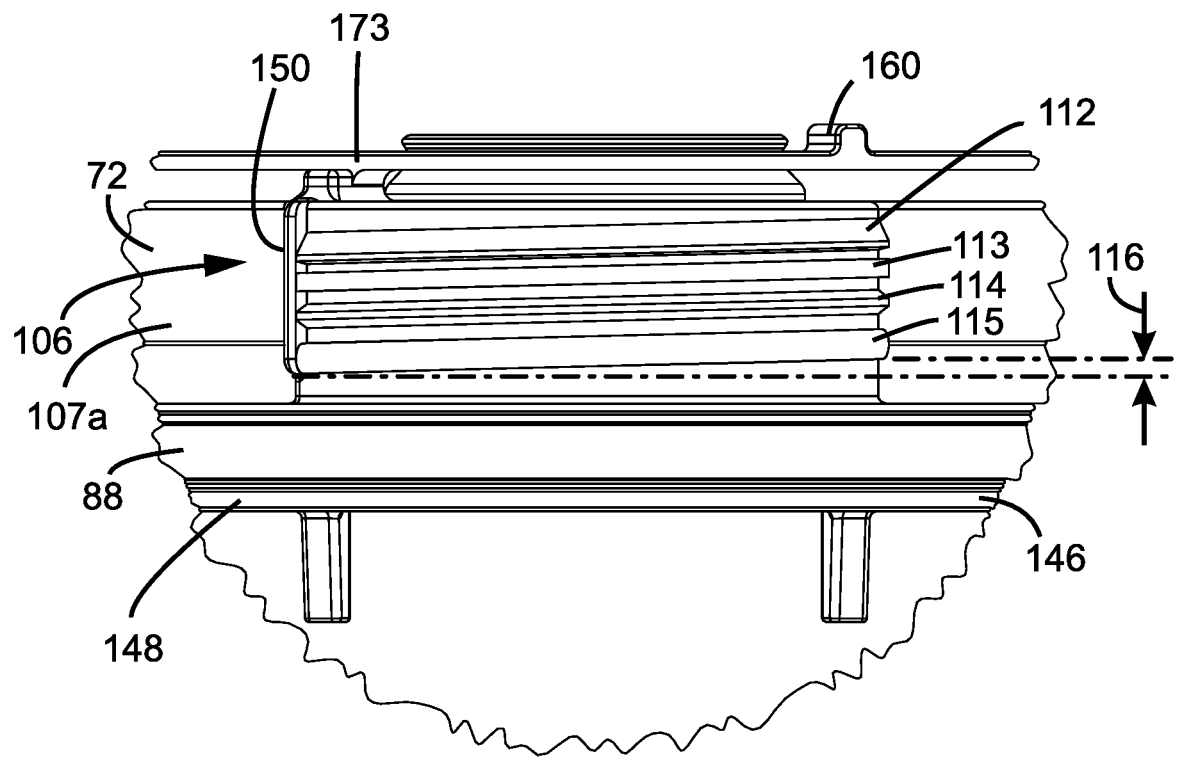
FIG. 7 is an enlarged, size view of a portion of the first end cap of FIGS. 5 and 6.

Reference is made to FIG. 8. In the embodiment shown, there are four helical profiles 112, 113, 114, 115. As can be seen in FIG. 7, the helical profiles 112-115 extend at a helix angle 116. By the term "helix angle", it is meant the angle of each of the helical profiles 112-115 relative to a plane perpendicular to the longitudinal axis 26. In FIG. 7, the helix angle is shown at reference numeral 116. Each of the helical profiles 112-115 preferably has the same helix angle 116, although in other embodiments, the helix angle 116 could be different for each helical profile 112-115.

In FIG. 12, 118*c* shows the amount of seal compression, which is affected by the helix angle 116.

Each of the helical profiles 112-115 is axially spaced from an adjacent helical profile 112-115. By "axial spacing", it is meant the spacing between the load bearing surfaces of each of the profiles 112-115. The "load bearing" surface is the surface that will be against the thread of the filter head, when connected. The load bearing surfaces, in this embodiment, are shown at 112*a*, 113*a*, 114*a*, and 115*a* in FIG. 20. The axial spacing between each of the individual helical profiles 112-115 can be the same or can be different. In the embodiment shown, the spacing is different. For example, FIGS. 8 and 20 illustrate the axial distance between connecting section 112 and 113 at D1; the distance between connecting section 113 and 114 at D2; and the distance between connecting section 114 and 115 at D3. While in some embodiments, each of D1, D2, and D3 can be equal, in many preferred embodiments, each of D1, D2, and D3 are of different values.

Each of the helical profiles 112-115 has a cross-sectional shape. The cross sectional shape of each of the helical profiles 112-115 can all be identical, or preferably, can be different from each other. Preferably, each of the helical profiles 112, 115 within each connecting section 106, 108, 110 has a different cross-sectional shape from at least one other helical profile 112-115 within the respective connecting section 106, 108, 110.

For example, in FIGS. 8 and 20, the upper most helical profile 112 has a trapezoidal shape, in which one of the non-parallel sides 112*a* is contained within a plane that is perpendicular to the longitudinal axis 26, while the other of the non-parallel sides 112*b* is angled relative to that same plane. The helical profile 113 is illustrated as being rectangular in shape, which could be square. The helical profile 114 is shown to be trapezoidal, in which both non-parallel sides are angled relative to a plane perpendicular to the longitudinal axis 26. The helical profile 115 is shown to be rounded in cross section. These are just examples, and it should be understood, that there are many, many different shapes and combinations that can be used. Indeed, every customer of these cartridges 24 can ask for their own specific "code" of helical profiles.

FIG. 21 illustrates an alternative helical profile combination, including differing the axial depths of the load bearing surfaces of the profiles. In the example of FIG. 21, there are 3 helical profiles 312, 313, 314, which vary in: shape, axial spacing, and load bearing depth. All three of the helical profiles 312, 313, 314 are trapezoidal, but differently shaped trapezoids from each other. The axial spacing between profile 312*a* and 313*a* is shown at D1, while the axial spacing between profile 313*a* and 314*a* is shown at D2. D1 and D2 are different, with D1 being greater than D2. The axial depths are shown at H1, H2, and H3. They are measured from the base of each of the axial bearing surfaces 312*a*, 313*a*, 314*a* and a terminal (free) end of each of the helical profiles 312, 313, 314. The axial depths H1, H2, H3 vary between each other in this example embodiment.

From a review of FIGS. 8, 20, and 21, it should be appreciated that when selecting the helical profile combination, the at least one (or more) of the helical profiles can vary between at least one other of the helical profiles by at least one of: profile shape, axial spacing, and/or axial depth, and/or any combination of these characteristics.

Preferably, each connecting section 106, 108, 110 is identical to the other connecting sections 106, 108, 110. This means that when mounting the cartridge 24 onto the filter head 22, the user does not have to be concerned about matching the correct connecting section 106, 108, 110 with the particular receiving connecting segments on the filter head 22. The filter cartridge 24 is constructed such that the filter housing 50 is non-removably secured to the outer radial wall 90 at the mouth 62 with the connecting sections 106, 108, 110 of the outer radial wall 90 being outside of the filter housing 50. Indeed, the connecting sections 106, 108, 110 will be located axially above a terminal end 98 (FIG. 8) of the housing 50.

Preferably, the outer radial wall 90 has a plurality of alternating circumferentially spaced connecting sections 106, 108, 110 and smooth non-connecting sections 107*a*, 107*b*, 107*c*. While the connecting sections 106, 108, 110 can be interrupted with short sections that do not form connections with the filter head 22, in general, in preferred examples, the non-connecting sections 107 will have no structure along the radial wall 90 that forms a connection or attachment with the filter head 22, although alternatives are possible. Any interruptions in the connecting sections 106, 108, 110 that do not form connections with the filter head 22 are not considered to within the definition of "non-connecting sections."

Figure 9:
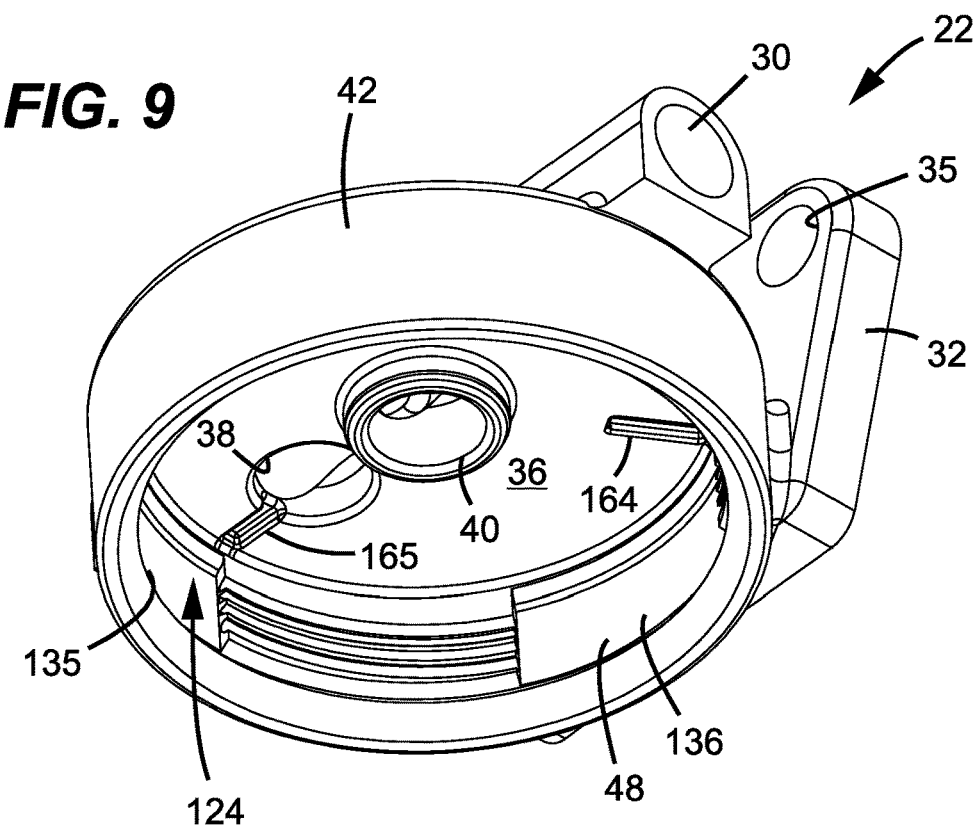
FIG. 9 is a bottom perspective view of the filter head used in the filter assembly of FIG. 2.
Figure 10:
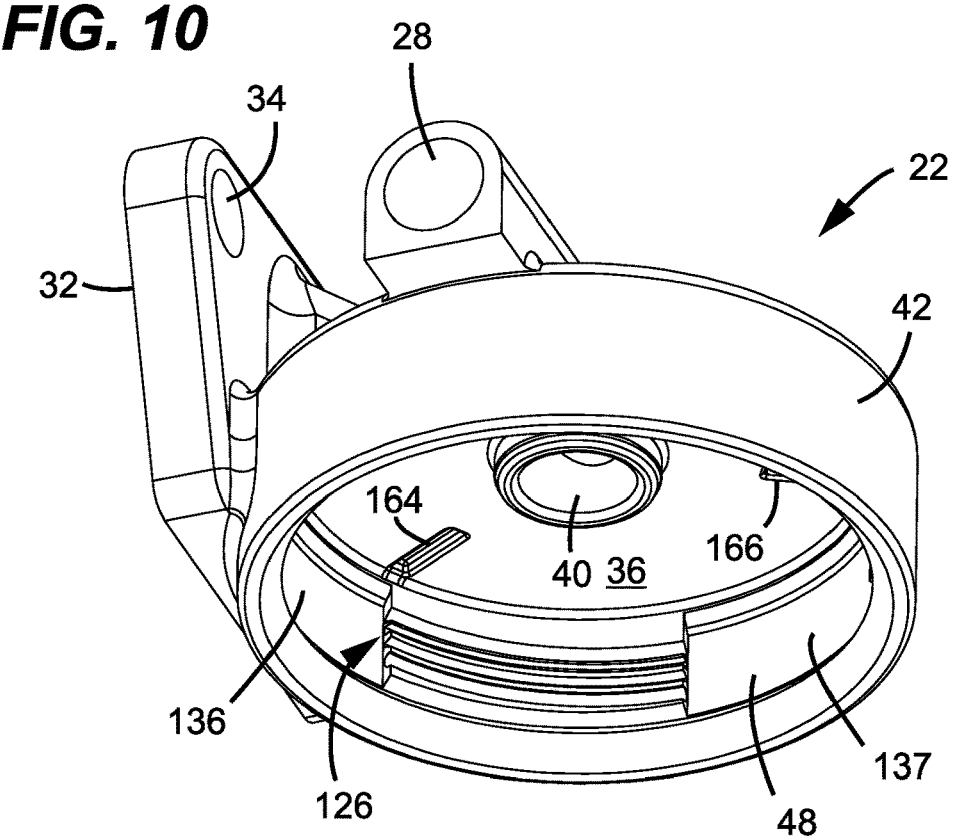
FIG. 10 is another bottom perspective view of the filter head of FIG. 9.
Figure 11:
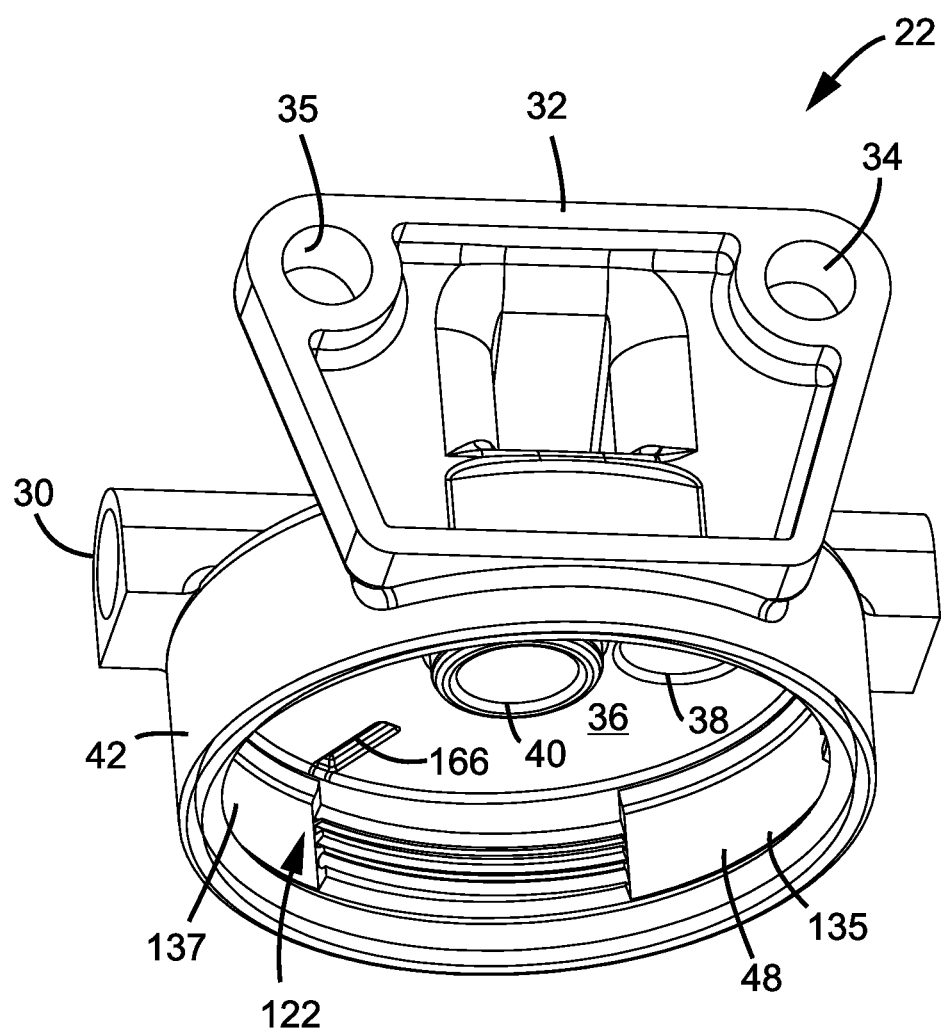
FIG. 11 is another bottom perspective view of the filter head of FIGS. 9 and 10.

In reference now to FIGS. 9-11, the filter head 22 is shown in further detail. The inner radial surface 48 of the filter head 22 includes a plurality of circumferentially spaced connecting segments 122, 124, 126 constructed and arranged to mate with the connecting sections 106, 108, 110 of the filter cartridge 24. Attention is directed to FIG. 12. In FIG. 12, it can be seen how the connecting segments 122, 124, 126 mate with the connecting sections 106, 108, 110. In particular, each of the connecting segments 122, 124, 126 have a profile 128, which is a mirror image of the profile shapes of the connecting sections 106, 108, 110. As such, the profile 128 includes recesses having the same cross-sectional shape as the helical profiles 112-115. For example, the profile 128 has an upper most profile recess 130 with a shape matching the trapezoidal shape of the helical profile 112. Similarly, profile recess 131 has a rectangular shape, which matches the cross-sectional shape of the helical profile 113. Profile recess 132 has a trapezoidal shape matching the shape of the helical profile 114, while profile recess 133 has a rounded shape to receive the rounded shape to receive the rounded helical profile 115. Of course, as the cross sectional shapes of the helical profiles 112-115 is changed, the corresponding profile recesses 130-133 would change as well.

As can be seen in FIGS. 9-11, the connecting segments 122, 124, 126 are circumferentially spaced along the inner radial surface 48 and are separated by smooth, ungrooved, portions 135, 136, 137 of the inner radial surface 48.

Figure 5:
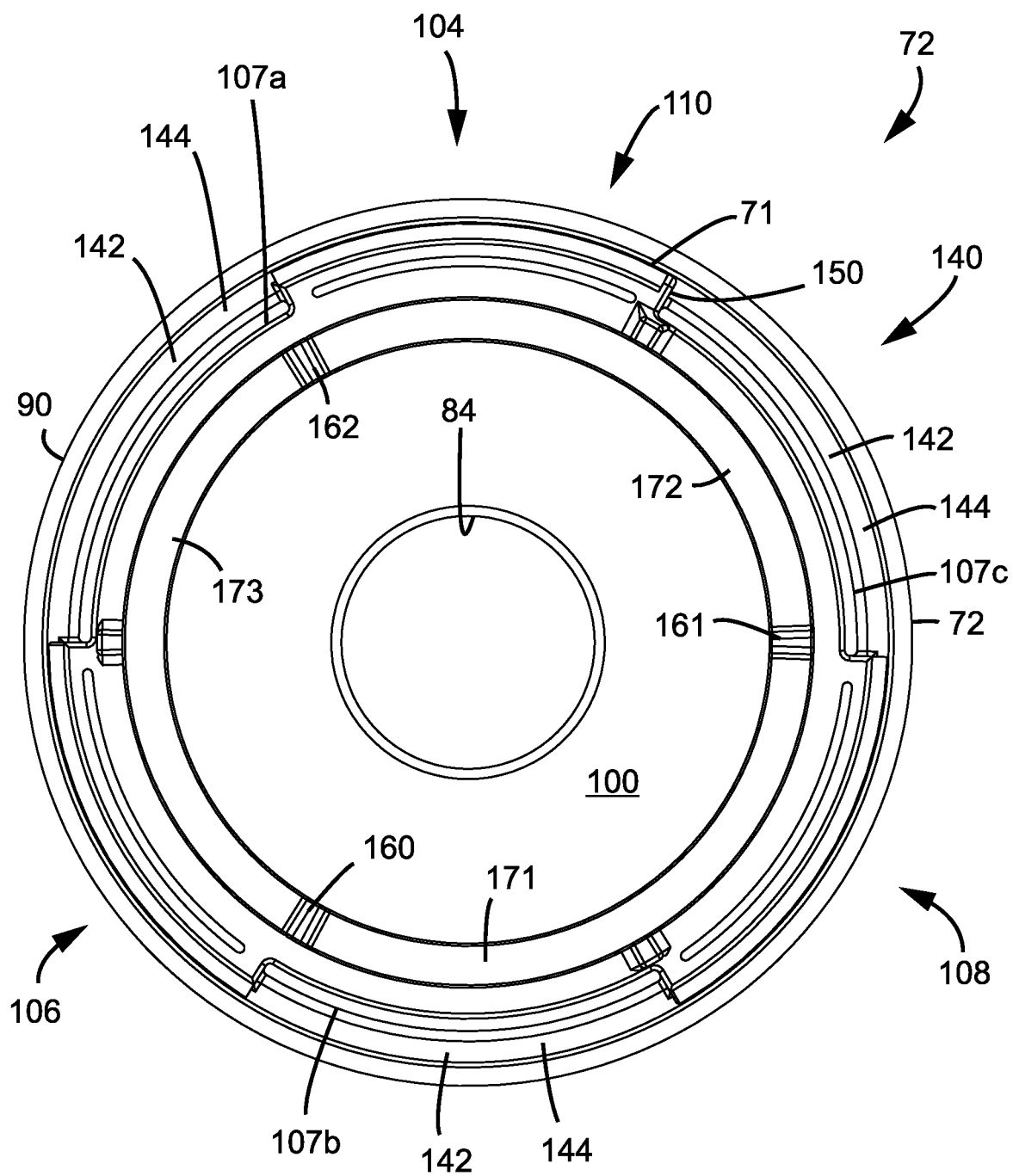
FIG. 5 is a top plan view of a first end cap used in the filter cartridge of FIG. 1.
Figure 6:
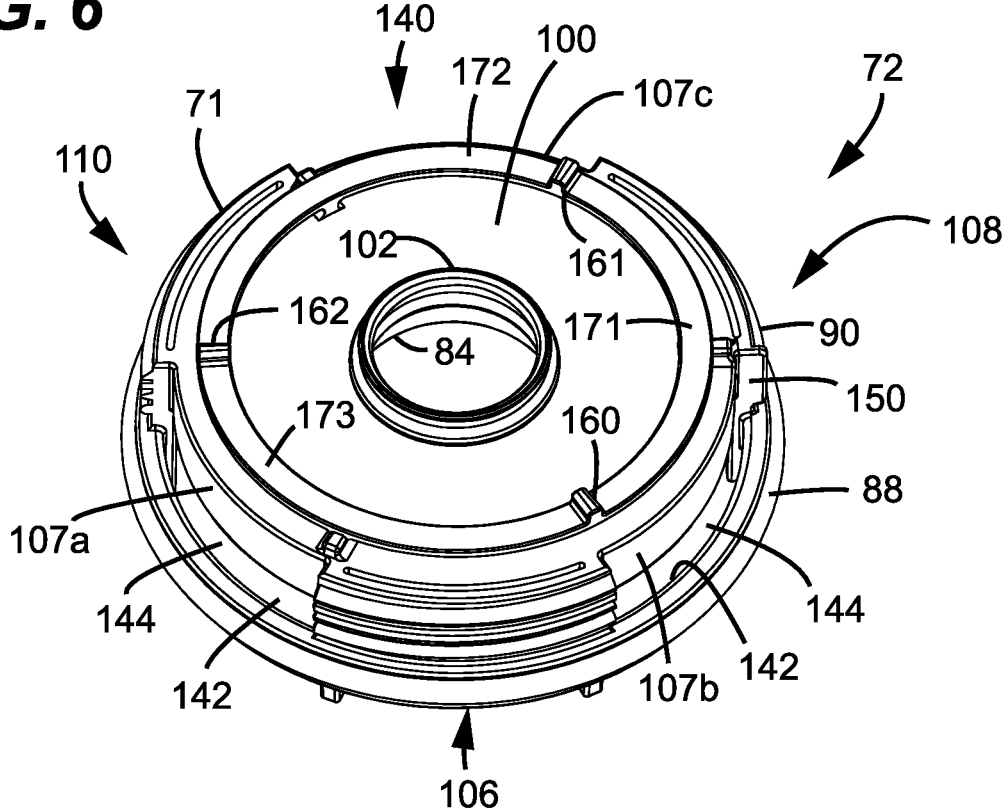
FIG. 6 is a perspective view of the first end cap of FIG. 5.

Attention is directed to FIGS. 5 and 6, which shown one preferred first end construction 71. The first end construction 71 is constructed and arranged to have an inlet arrangement 140. The inlet arrangement 140 includes, in the example embodiment, a plurality of fluid flowpaths 142, which can be inlet openings 142, in the first end construction 71. When fluid to be filtered enters the filter assembly 20, it flows into the filter head 22 through the inlet 28 through the inlet opening 38, where it exits the filter head 22 and enters the filter cartridge 24. The fluid to filtered then enters the annulus 86 of the cartridge 24 by flowing through the inlet openings 142 in the first end construction 71.

In this embodiment, the outer radial wall 90 of the first end construction 71 is spaced from and attached to the axial wall 100 to define a plurality of circumferentially spaced gaps 144 therebetween. The gaps 144 function as the inlet openings 142. In the preferred embodiment depicted, the circumferentially spaced connecting sections 106, 108, 110 alternate with the open gaps 144 in the outer radial wall 90. The gaps 144 correspond to the non-connecting sections 107. The outer radial wall 90 has a continuous walled ring 146 at a distal end 148 from the axial wall 100. The continuous ring 146 is continuous in that it circumscribes and forms the entire outer periphery of the first end construction 71. The continuous ring 146 holds the seal member 88 thereon.

In the example embodiment, the gaps 144 forming the inlet openings 142 are between the ring 146 and the non-connecting sections 107a, 107b, 107c.

The filter cartridge 24 can further include a stop member 150. The stop member 150 provides an engagement surface for a portion of the filter head 22 to abut or engage when the filter cartridge 24 is being mounted on and secured to the filter head 22. The stop member 150 will provide feedback to the user that the cartridge 24 has been fully mated onto the filter head 22 with the mating of the connecting sections 106, 108, 110 and the connecting segments 122, 124, 126. The engagement between the filter head 22 and the stop member 150 will prevent further rotation of the filter cartridge 24 relative to the filter head 22.

In the embodiment shown, the stop member 150 is radially protruding from the outer radial wall 90 of the first end construction 71. In the example embodiment shown, the stop member 150 extends from the outer radial wall 90 at terminal ends of the helical profiles 112-115 of at least one of the connecting sections 106, 108, 110. In the example shown in FIGS. 5 and 7, there is only a single stop member 150 on the first end construction 71. In some embodiments, the stop member 150 can extend from terminal ends of each of the connecting sections 106, 108, 110.

The helical profiles 112-115 can, in some variations, include a projecting bump toward the end of the profiles that would be engaged just prior to full attachment between the filter head 22 and the cartridge 24. The bumps would require extra torque at the end of the attachment process between the connecting sections 106, 108, 110 from the connecting segments 122, 124, 126. The bumps would help to prevent unintended disconnection between the filter head 22 and the cartridge 24 due to, for example, vibration.

In accordance with principles of this disclosure, the filter cartridge 24 can further include at least one spring-loaded detent 160. The detent 160 extends axially outwardly from the axial wall 100 of the first end construction 71. In many preferred embodiments, and in the embodiment illustrated, there are a plurality of spring loaded detents 160, 161, 162, each extending axially outwardly from the axial wall 100 of the first end construction 71. The spring loaded detents 160, 161, 162 are circumferentially spaced from one another and are radially outward of the central flow aperture 84, while being radially inward of the inlet openings 142.

Each spring loaded detent 160, 161, 162 includes a spring, such as a leaf spring 171, 172, 173 attached to the axial wall 100 to allow for elastic deflection of the detent 160, 161, 162 in an axial direction.

The detents 160, 161, 162 are received by detent recesses 164, 165, 166 defined within an inner surface 176 of the end wall 36 of the filter head 22. The interaction between the detents 160-162 and detent recesses 164-166 provide feedback, such as an audible "click" sound to inform the user that the filter cartridge 24 has been properly installed on the filter head 22. The detents 160, 161, 162 also help to prevent the filter cartridge 24 from backing off of the filter head 22 due to vibration during operation. The feedback, in addition to being audible, can also be tactile, in that the user can also feel when the detents 160-162 are recesses 164-166.

Figures 13, 14, 15:
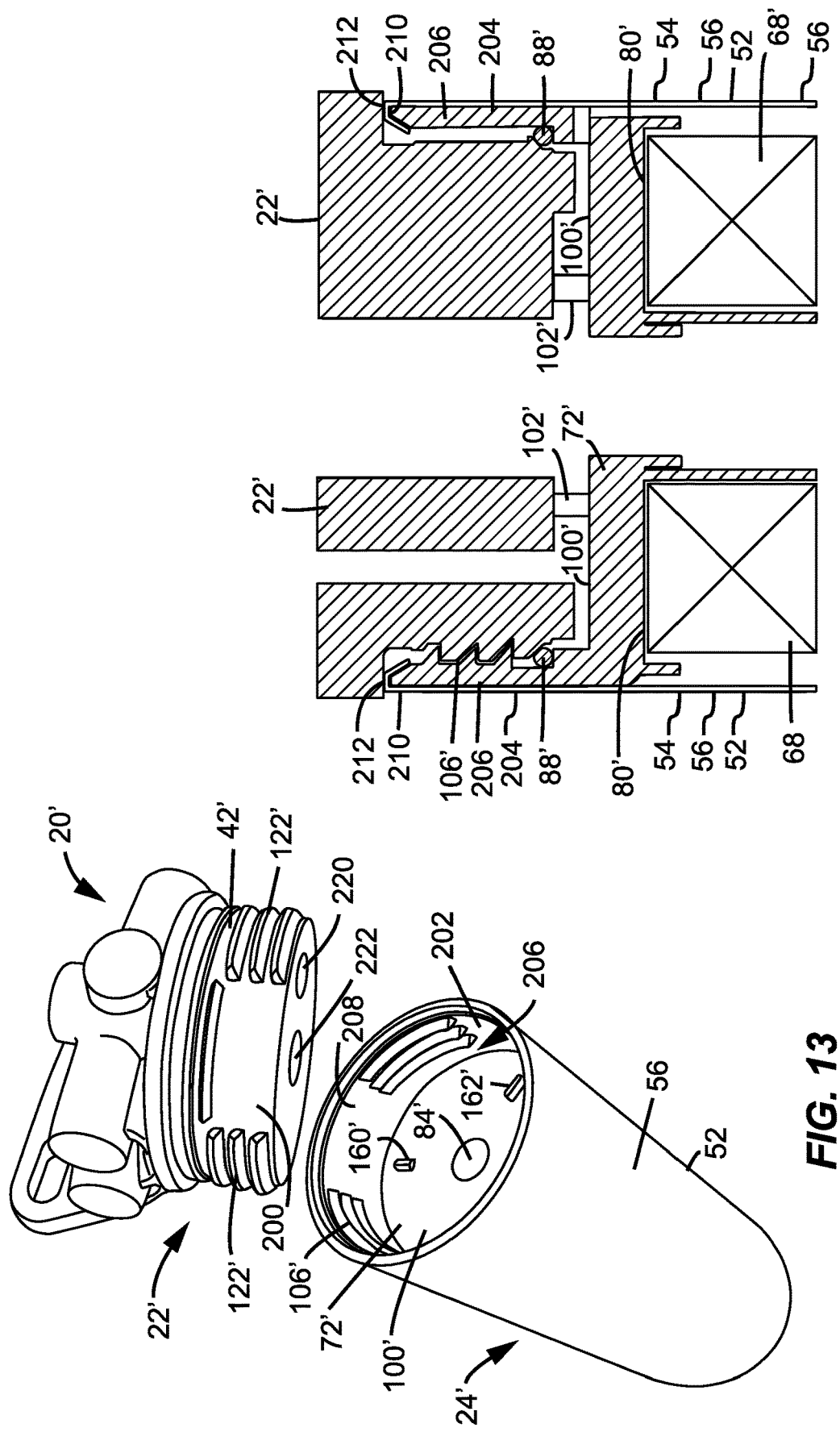
FIG. 13 is an exploded perspective view of another embodiment of a filter assembly, similar to the assembly of FIG. 2 except that the connecting segments of the filter head are along an outer radial surface of the filter head and the connecting sections of the filter cartridge are along an inner wall of the cartridge.
FIG. 14 is a schematic cross-sectional view of a portion of the filter assembly of FIG. 13 showing the connection between the filter head and the filter cartridge.
FIG. 15 is a schematic cross-sectional view of a portion of the filter assembly of FIG. 13 showing a part of the interface between the filter head and the filter cartridge.
Figure 17:
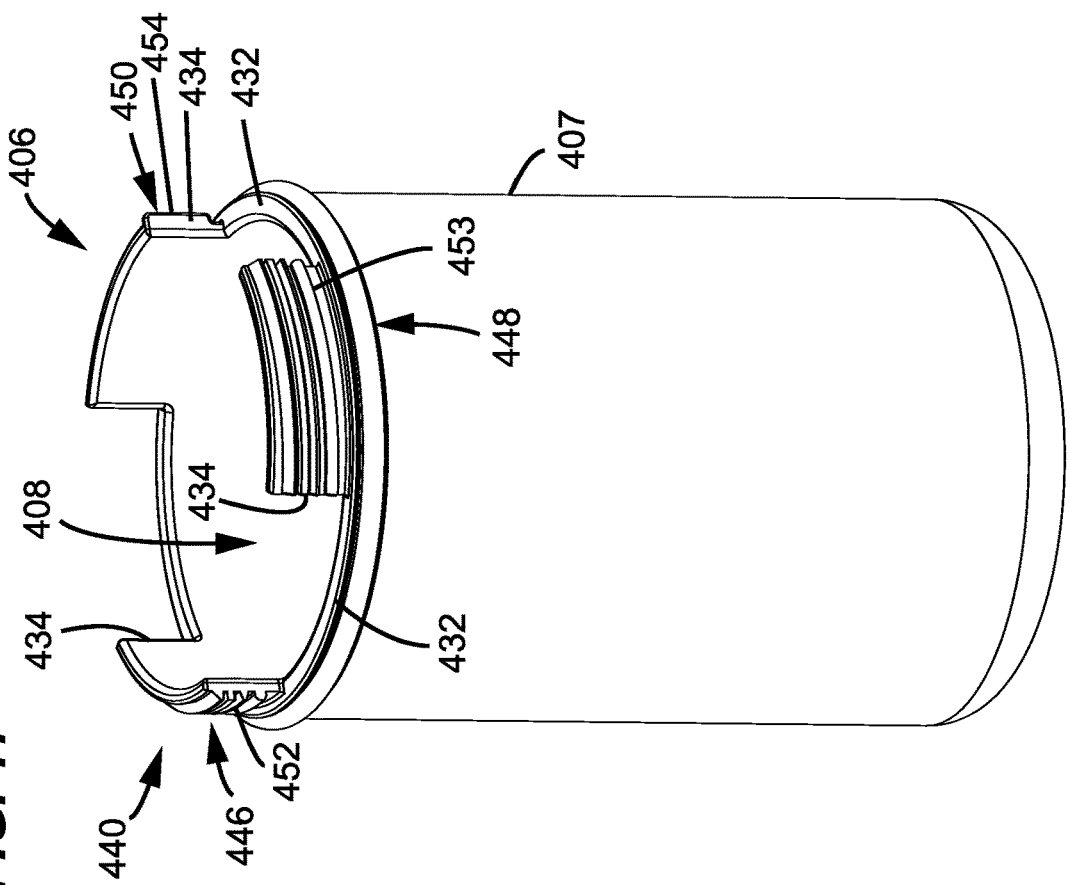
FIG. 17 is a perspective view of a filter bowl, which is used with the filter cartridge of FIG. 16.
Figure 16:
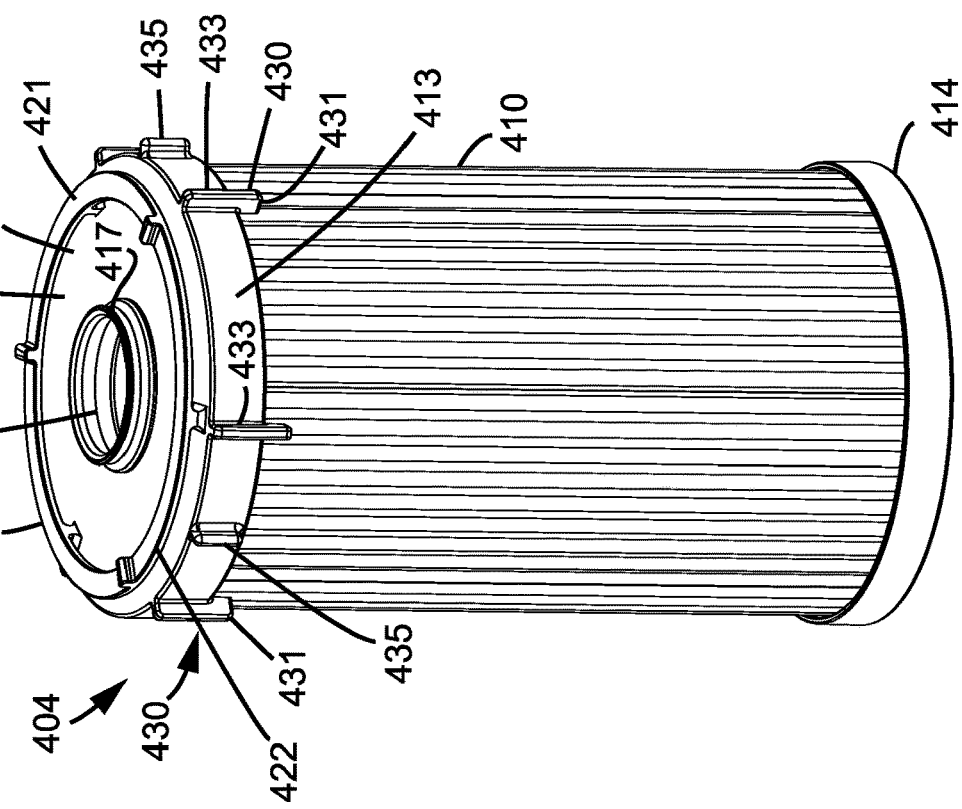
FIG. 16 is a perspective view of a filter cartridge, constructed in accordance with principles of this disclosure.

An alternative embodiment of the filter assembly 20 is shown in FIGS. 13-15 at 20'. The construction and features of the assembly 20' is the same as that of assembly 20, and those descriptions and features are not again described here, but rather, are incorporated herein by reference. The difference between the assembly 20 and the assembly 20' is that the plurality of circumferentially spaced connecting segments 122' is on an outer radial surface 200 of the band 42' filter head 22', while the connecting sections 106' of the filter cartridge 24' are along an inner wall 202 of the end cap 72'. The end cap 72' has a surrounding wall 204 that is radially outside of the outer diameter of the filter media 68'. The surrounding wall 204 includes an extension 206 that projects axially from the first end 80' of the media 68', in a direction opposite of the media 68'. The volume 208 within the extension 206 and between the end cap 72' and a terminal end 210 of the extension 206 is sized to receive the band 42' of the filter head 22'.

In FIGS. 14 and 15, it can be appreciated that the surrounding wall 54 of the can 52 is non-removably attached to a remaining part of the cartridge 24'. In the example shown, the can 52 is attached to the end cap 72' by being folded or crimped at crimp section 212 over the terminal end 210 of the end cap extension 206.

The axial wall 100' of the end cap 72' can include detents, such as 160', 162' projecting therefrom. The detents 160', 162' are received within the detent recesses in the filter head 22' provide feedback in the form of an audible click or a tactile click feeling.

A seal member 102' can be seen in FIGS. 14 and 15 to provide a seal between unfiltered flow on the inlet side (dirty side) of the media 68' and the outlet side (clean side) of the media 68'. The seal member 102' is around the outlet 84' of the cartridge 24'. In the filter head 22', the unfiltered liquid flows through an unfiltered liquid port 220 to the cartridge 24'. After flowing through the media 68', the filtered liquid returns to the head 22' through filtered liquid port 222.

An alternative embodiment of a bowl cartridge assembly is shown in FIGS. 16-19 at 402. The bowl cartridge assembly 402 includes a filter cartridge 404 and a filter bowl 406.

Figure 19:
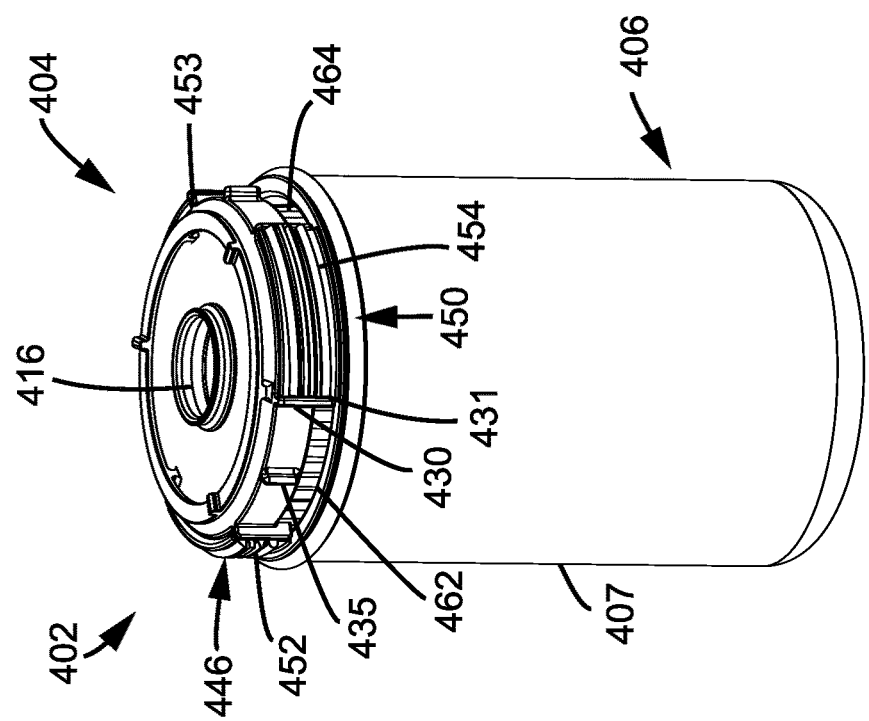
FIG. 19 is a perspective view showing the filter cartridge of FIG. 16 fully installed in the filter bowl of FIG. 17.
Figure 18:
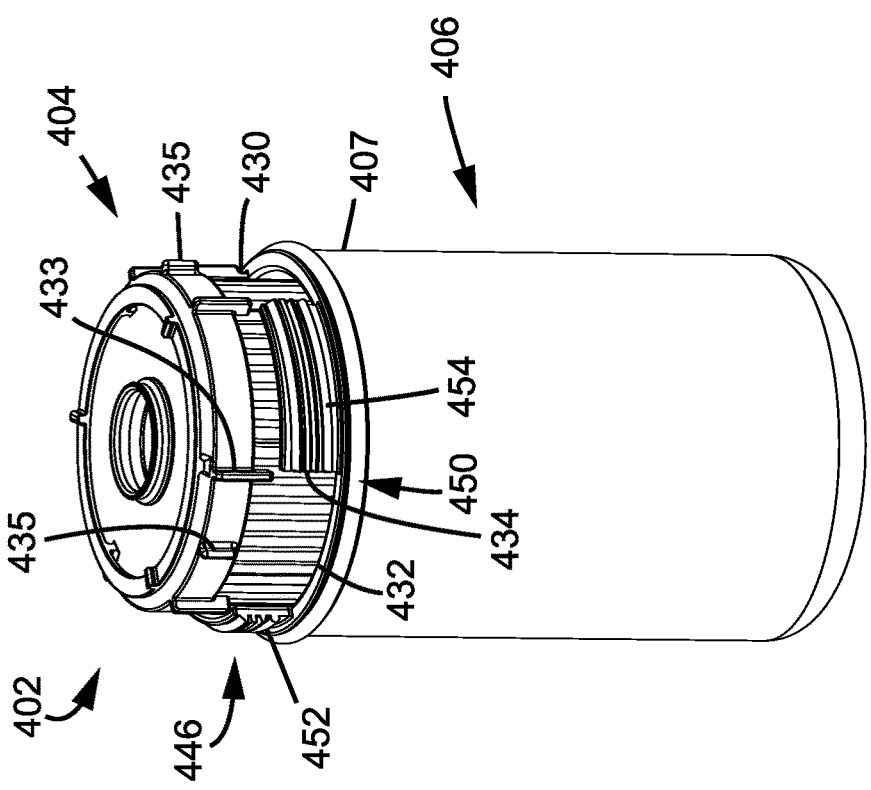
FIG. 18 is a perspective view showing the filter cartridge of FIG. 16 during a step of being installed in the filter bowl of FIG. 17.

The filter cartridge 404 is insertable and removable and replaceable within the filter bowl 406. The filter bowl 406 removably connects/attaches to a filter head, such as filter head 22 of FIGS. 9 and 10. FIG. 18 shows the filter cartridge 404 partially installed within an interior 408 of the filter bowl 406, and FIG. 19 shows the filter cartridge 404 fully installed and positioned within the interior 408 of the filter bowl 408.

The filter cartridge 404 can vary. In the example shown, the filter cartridge 404 has a tubular (e.g., cylindrical) section of pleated filter media 410. At opposite ends of the filter media 410 are first and second end constructions or end caps 412, 414. The first end cap 412 is an open end cap having a through opening 416, which is in communication with an interior of the pleated filter media. The second end cap 414 can be open or closed. There can be a seal member 417 circumscribing the opening 416.

The first end cap 412 can include at least one, and in the example shown, a plurality of spring loaded detents 420, 421, 422 each extending axially outwardly from the axial wall 419 of the first end cap 412. The spring loaded detents 420, 421, 422 are analogous to the detents 160, 161, 162, and the description of 160, 161, 162 applies to detents 420, 421, 422 and is not again repeated. The detents 420, 421, 422 are received by, for example, detent recesses 164, 165, 166 defined within an inner surface 176 of the end wall 36 of the filter head 22 to provide feedback, such as an audible "click" sound to inform the user that the filter cartridge 404 has been properly installed on the filter head 22, while also preventing the filter cartridge 404 from backing off of the filter head 22 due to vibration during operation. The feedback, in addition to being audible, can also be tactile.

The first end cap 412 includes a first plurality of circumferentially spaced radial projections 430 extending radially from an outer perimeter 413 of the first end cap 412. The first plurality of radial projections 430 have a first longitudinal length with a terminal end 431 sized to engage a rim 432 the filter bowl 406, when the cartridge 404 is inserted into the filter bowl 406.

The first plurality of radial projections 430 having a least one lateral (or side) portion 433 oriented to circumferentially abut a part of the filter bowl 406 when the cartridge 404 is inserted into the bowl 406. As shown in FIGS. 18 and 19, the lateral portion 433 will circumferentially engage against a lateral edge 434 of spaced connecting sections 446, 448, and 450 (described below), which helps to angularly locate, or clock, the spring loaded detents 420, 421, 422 relative to the filter head 22. The radial projections 430 also will prevent rotation of the cartridge 404 within the bowl 406 by engaging against the lateral edges 434 of the connecting sections 446, 448, and 450.

The first end cap 412 further includes a second plurality of circumferentially spaced radial projections 435 extending from the outer radial wall 413. The second plurality of radial projections 435 having a second longitudinal length that is shorter than the first longitudinal length of the first radial projections 430.

The second plurality of radial projections 435 are oriented to assist with correct rotational positioning of the cartridge 404 within the filter bowl 406, when the cartridge 404 is inserted into the filter bowl 406. The second radial projections 435 will interfere with connecting sections 446, 448, and 450 and thereby prevent the cartridge 404 from being inserted in the bowl 406 unless properly aligned with the bowl 406.

In accordance with principles of this disclosure, the filter bowl 406 includes an outer radial wall 407, forming a surrounding wall defining the interior volume 408 therewithin. The filter bowl 406 has a system to allow for a low friction installation of the bowl cartridge assembly 402 to the filter head 22, including simply inserting and rotating the assembly 402 less than a full turn. In this embodiment, the system includes a connection system 440, analogous to system 104 described above, and not again repeated here. The connection system 440 works like the system 104 and allows for low friction insertion and turning of the assembly 402 less than 180° for example, about 60°. The connection system 440 eliminates cross-threading, and lends itself to having the connectors be specific to specific customers. The connection system 440 is implemented on the outer radial wall 407.

The connection system 440 includes a plurality of circumferentially spaced connecting sections, illustrated herein as 446, 448, and 450, analogous to connecting sections 106, 108, 110, having a plurality of helical profiles 452, 453, 454, analogous to helical profiles 112, 113, 114. The helical profiles 452, 453, 454 can have the various characteristics as described above in association with FIGS. 8, 20, and 21, the description being incorporated herein by reference, and not again repeated here.

When the filter cartridge 404 is installed in the bowl 406, flow gaps 462, 464 result between the filter cartridge 404 and the filter bowl 406. The flow gaps 462, 464 are also circumferentially between adjacent connecting sections 446, 448, 450. When secured to the filter head 22, the flow gaps 462, 464 can be flow passageways for inlet fluid flow to be filtered. The fluid to be filtered flows from the filter head 22, into the filter assembly 402 and into the flow gaps 462, 464. Then, it flow radially through the filter media 410 (removing impurities from the fluid) into the filter interior. From there, it exits the filter assembly 402 by flowing through the opening 416 in the first end cap 412 and back into the filter head 22. After a period of use, the filter cartridge 404 can be removed from the bowl 406 and replaced with a new filter cartridge 404. The bowl 406 is mounted on the filter head 22 through mating of the connection system 440, as described above with respect to system 104.

The bowl cartridge assembly 402 can be used with a filter head, such as filter head 22, to form a filter assembly.

A method of servicing the filter assembly 20 can be practiced using the above principles. After a period of operation, the filter cartridge 24 will need servicing by replacing the cartridge 24, due to the filter media 68 becoming clogged. To service the filter assembly 20, the old filter cartridge 24 is removed from the filter head 22 and discarded. To remove the old filter cartridge 24 from the filter head, the cartridge 24 is rotated relative to the filter head 22, preferably by hand and without the use of tools. The cartridge 24 is rotated in such a way as to unmate the connecting sections 106, 108, 110 from the connecting segments 122, 124, 126. This also releases the seal member 88, and allows the cartridge 24 to be pulled axially from the filter head 22.

A new filter cartridge 24 with new media 68 is then provided. The new filter cartridge 24 is mounted onto the filter head 22 by aligning the outlet opening 40 of the filter head 22 with the grommet seal member 102 of the cartridge 24. The cartridge 24 is pushed axially toward the filter head 22 and then rotated less than 90°, typically no more than 60°. The cartridge 24 is rotated to engage or mate the connecting sections 106, 108, 110 with the connecting segments 122, 124, 126. The cartridge 24 can be rotated until the stop member 150 prevents further rotation of the cartridge 24 within the filter head 22. As the cartridge 24 is being rotated within the filter head 22, the seal member 88 is compressed, to form the seal between and against the filter head 22 and the cartridge 24. During the step of rotation, the cartridge 24 is rotated until the detents 160, 161, 162 are received within the detent recesses 164, 165, 166, and feedback in the form of an audible click or a tactile click feeling is detected by the user. This will ensure that the filter cartridge 24 has been properly installed on the filter head 22, and the filter assembly 20 is again ready for filtration.

The above represents example principles. Many embodiments can be made using these principles.

What is claimed is:

1. A filter cartridge comprising: (a) a treatment media construction having a first end and an opposite second end;
   (b) a first end construction adjacent to the first end of the media construction;
   wherein the first end construction includes an outer radial wall and an axial wall;
      (i) the axial wall covering the first end of the media construction;
      (ii) the outer radial wall having a plurality of connecting sections alternating with non-connecting sections, wherein each connecting section has a plurality of helical profiles extending at a helix angle;
   (c) a filter housing having a surrounding wall defining an exterior, an interior, a bottom, and an opposite mouth;
      (i) the filter housing being secured to the outer radial wall at the mouth; and
      (ii) the media construction being positioned within the interior and spaced from the surrounding wall.

2. The filter cartridge of claim 1 wherein the outer radial wall overlaps a portion of the media construction.

3. The filter cartridge of claim 1 wherein the non-connecting sections are smooth.

4. The filter cartridge of claim 1 wherein the treatment media construction includes pleated media arranged in a tube-shape having an open interior volume.

5. The filter cartridge of claim 1 wherein each of the non-connecting sections is equally spaced from each other.

6. The filter cartridge of claim 1 wherein each of the helical profiles within each connecting section has a different cross-sectional shape from at least one other helical profile within a respective connecting section.

7. The filter cartridge of claim 1 wherein within each connecting section, each of the helical profiles is axially spaced from an adjacent helical profile, and the axially spacing between at least one helical profiles and a second helical profile is different from remaining axially spacing.

8. The filter cartridge of claim 1 wherein each connecting section is identical to the other connecting sections.

9. The filter cartridge of claim 1 wherein each connecting section has at least 4 helical profiles.

10. The filter cartridge of claim 1 wherein there are at least 3 connecting sections.

11. The filter cartridge of claim 1 further including a radially protruding stop member extending from the outer radial wall at terminal ends of the helical profiles of at least one of the connecting sections.

12. The filter cartridge of claim 3 further including at least one spring-loaded detent extending axially outwardly from the axial wall of the first end construction.

13. The filter cartridge of claim 1 wherein portions of the outer radial wall are axially spaced from the axial wall to define a plurality of circumferentially spaced gaps defining fluid flowpaths.

14. The filter cartridge of claim 13 wherein the outer radial wall includes the plurality of circumferentially spaced connecting sections alternating with the gaps.

15. A filter cartridge comprising:
   (a) a treatment media construction having a first end and an opposite second end;
   (b) a first end construction adjacent to the first end of the media construction;
   (c) wherein the first end construction includes an outer radial wall and an axial wall;
      (i) the axial wall covering the first end of the media construction;
      (ii) the outer radial wall having a plurality of circumferentially spaced connecting sections; each connecting section having a plurality of helical profiles extending at a helix angle;
      (iii) each of the helical profiles within each connecting section has a different cross-sectional shape from at least one other helical profile within a respective connecting section;
   (d) a filter housing having a surrounding wall defining an exterior, an interior, a bottom, and an opposite mouth;
      (i) the filter housing being secured to the outer radial wall at the mouth; and
      (ii) the media construction being positioned within the interior and spaced from the surrounding wall.

16. The filter cartridge of claim 15 wherein within each connecting section, each of the helical profiles is axially spaced from an adjacent helical profile, and the axially spacing between at least one helical profiles and a second helical profile is different from remaining axially spacing.

17. A filter cartridge comprising:
   (a) a treatment media construction having a first end and an opposite second end;
   (b) a first end construction adjacent to the first end of the media construction;
   (c) wherein the first end construction includes an outer radial wall and an axial wall;
      (i) the axial wall covering the first end of the media construction;
      (ii) the outer radial wall having a plurality of circumferentially spaced connecting sections; each connecting section having a plurality of helical profiles extending at a helix angle;

(iii) within each connecting section, each of the helical profiles being axially spaced from an adjacent helical profile, and the axially spacing between at least one helical profiles and a second helical profile is different from remaining axially spacing; and (d) a filter housing having a surrounding wall defining an exterior, an interior, a bottom, and an opposite mouth;

(i) the filter housing being secured to the outer radial wall at the mouth; and (ii) the media construction being positioned within the interior and spaced from the surrounding wall.

18. The filter cartridge of claim 17 wherein the connecting sections are separated by a plurality of non-connecting sections on the outer radial wall, the non-connecting sections being spaced from each other.

19. The filter cartridge of claim 18 wherein each of the non-connecting sections is equally spaced from each other.

20. A filter cartridge comprising:

(a) a treatment media construction having a first end and an opposite second end;

(b) a first end construction adjacent to the first end of the media construction;

wherein the first end construction includes an outer radial wall and an axial wall;

(i) the axial wall covering the first end of the media construction;

(ii) the outer radial wall having a plurality of connecting sections alternating with non-connecting sections;

(c) a filter housing having a surrounding wall defining an exterior, an interior, a bottom, and an opposite mouth;

(i) the filter housing being secured to the outer radial wall at the mouth; and (ii) the media construction being positioned within the interior and spaced from the surrounding wall; and (d) at least one spring-loaded detent extending axially outwardly from the axial wall of the first end construction.

21. The filter cartridge of claim 20 wherein the treatment media construction includes pleated media arranged in a tube-shape having an open interior volume.

22. The filter cartridge of claim 20 wherein each of the non-connecting sections is equally spaced from each other.

23. The filter cartridge of claim 20 wherein each connecting section has a plurality of helical profiles extending at a helix angle.

24. The filter cartridge of claim 20 wherein each of the helical profiles within each connecting section has a different cross-sectional shape from at least one other helical profile within a respective connecting section.

25. The filter cartridge of claim 20 wherein within each connecting section, each of the helical profiles is axially spaced from an adjacent helical profile, and the axially spacing between at least one helical profiles and a second helical profile is different from remaining axially spacing.

26. The filter cartridge of claim 20 wherein each connecting section is identical to the other connecting sections.

27. The filter cartridge of claim 20 wherein each connecting section has at least 4 helical profiles.

28. The filter cartridge of claim 20 wherein there are at least 3 connecting sections.

29. The filter cartridge of claim 20 wherein portions of the outer radial wall are axially spaced from the axial wall to define a plurality of circumferentially spaced gaps defining fluid flowpaths.

* * * * *